United States Patent
Bromfield

(10) Patent No.: US 10,279,752 B2
(45) Date of Patent: May 7, 2019

(54) CARGO CARRIER ATTACHMENT SYSTEM

(71) Applicant: Nitmobi, LLC, Matthews, NC (US)

(72) Inventor: Robert L. Bromfield, Matthews, NC (US)

(73) Assignee: Nitmobi, LLC, Matthews, NC (US)

( * ) Notice: Subject to any disclaimer, the term of this patent is extended or adjusted under 35 U.S.C. 154(b) by 0 days.

(21) Appl. No.: 15/595,491

(22) Filed: May 15, 2017

(65) Prior Publication Data

US 2017/0327051 A1    Nov. 16, 2017

Related U.S. Application Data

(60) Provisional application No. 62/336,805, filed on May 16, 2016.

(51) Int. Cl.
*B60R 9/00* (2006.01)
*B60R 9/06* (2006.01)

(52) U.S. Cl.
CPC .......... *B60R 9/065* (2013.01); *B62B 2203/74* (2013.01)

(58) Field of Classification Search
CPC ............................ B60R 9/065; B62B 2203/74
USPC ........................................................ 224/486
See application file for complete search history.

(56) References Cited

U.S. PATENT DOCUMENTS

| | | | |
|---|---|---|---|
| 4,438,875 A | 3/1984 | Fritsch | |
| 5,366,338 A * | 11/1994 | Mortensen | B60P 3/07 224/924 |
| 5,482,424 A * | 1/1996 | Jones | A61G 3/0209 224/510 |
| 5,984,613 A | 11/1999 | Motilewa | |
| 6,007,290 A * | 12/1999 | Schulz | B60R 9/06 414/462 |
| 6,352,401 B1 * | 3/2002 | LeMay | B60P 3/125 280/402 |
| 6,536,846 B1 | 3/2003 | Felty | |
| 6,612,315 B2 | 9/2003 | Dimand | |
| 6,663,133 B1 * | 12/2003 | Rosenlund | B60D 1/06 280/490.1 |
| 6,824,156 B2 * | 11/2004 | Smith | B60D 1/52 280/490.1 |

(Continued)

OTHER PUBLICATIONS

Wheelchair Carrier, Inc., "US208S Scooter/ Power Chair Carrier—210 Lift N Go" Installation Guide & Owners Manual, downloaded Apr. 13, 2016 from www.wheelchaircarrier.com.

*Primary Examiner* — Peter N Helvey
(74) *Attorney, Agent, or Firm* — Ashley Law Firm, P.C.; Stephen S. Ashley, Jr.

(57) ABSTRACT

A system for attaching a mobile cargo carrier, such as a wheeled cart, to a motor vehicle comprises a cargo carrier apparatus, a hitch attachment apparatus adapted for releasable attachment to a motor vehicle hitch, and a coupling device for releasably connecting the cargo carrier apparatus and the hitch attachment apparatus. The coupling device includes a hollow member sized and shaped to receive the elongate bar of the cargo carrier. The coupling device can include a hand crank winch and cable or strap. The cable or strap is attached to the cargo carrier, and using the hand crank, the winch lifts the cargo carrier off the ground with the bar moving upward telescopically within the hollow member of the coupling device. As such, the cargo carrier apparatus can be easily transported by the automobile.

20 Claims, 32 Drawing Sheets

(56) References Cited

U.S. PATENT DOCUMENTS

| | | | |
|---|---|---|---|
| 6,887,027 B2 | 5/2005 | O'Leary et al. | |
| 6,935,656 B2 | 8/2005 | Stout | |
| 7,219,915 B2 * | 5/2007 | Christensen | B60D 1/46 |
| | | | 280/490.1 |
| 7,641,235 B1 | 1/2010 | Anduss | |
| 7,798,760 B2 | 9/2010 | Strassman et al. | |
| 8,162,192 B1 | 4/2012 | Sanchez | |
| 8,327,979 B2 * | 12/2012 | Lynch | B66F 7/24 |
| | | | 187/212 |
| D744,382 S | 12/2015 | Woller et al. | |
| 9,216,698 B2 * | 12/2015 | Rhodes | B60R 9/065 |
| 9,233,634 B1 * | 1/2016 | Level | B60P 3/125 |
| 10,023,129 B2 * | 7/2018 | Ehlers | B60R 9/06 |
| 2003/0156930 A1 * | 8/2003 | Ahedo, Jr. | A61G 3/0209 |
| | | | 414/462 |
| 2003/0165376 A1 * | 9/2003 | Bruno | A61G 3/0209 |
| | | | 414/462 |
| 2004/0173654 A1 * | 9/2004 | McAlister | B60D 1/52 |
| | | | 224/519 |
| 2008/0100076 A1 * | 5/2008 | Potts | B60R 9/06 |
| | | | 296/3 |
| 2010/0272548 A1 | 10/2010 | McKamey | |

\* cited by examiner

CARGO CARRIER ATTACHMENT SYSTEM

CROSS REFERENCE TO RELATED APPLICATIONS

This application claims priority to U.S. Provisional Application No. 62/336,805, filed May 16, 2016 and incorporated herein by reference.

TECHNICAL FIELD OF INVENTION

The present invention relates to the mechanical arts. An embodiment of the invention comprises a system for attaching a mobile cargo carrier to a motor vehicle.

BACKGROUND OF INVENTION

Cargo carriers, such as wheeled carts and wagons, are commonly used to transport a plurality of items and/or people short distances. Carts and wagons are often used to transport multiple items from an automobile parked in a parking lot to a nearby destination. For example, carts and wagons are frequently used to transport items such as beach chairs, towels and coolers from a parked automobile to the beach. Likewise, carts and wagons are often used to transport athletic equipment such as balls, gloves, bats, helmets, and pads from a parked automobile to a ballfield. However, upon returning to the automobile, the task of loading the cart or wagon into the automobile for transporting back home can be difficult and cumbersome. This is particularly so if the cart or wagon is loaded with heavy items. Often, the user must unload all of the items from the cart or wagon in order to be able to lift the cart or wagon into the automobile. The unloaded items must then be re-loaded into the automobile, which is inefficient and tiring.

SUMMARY OF INVENTION

Accordingly, an object of the present invention is to provide a cargo carrier attachment apparatus that provides a convenient means for attaching a cargo carrier to an automobile for transporting the cargo carrier. Another object of the invention is to provide an attachment apparatus for attaching a cargo carrier to a vehicle trailer hitch. These and other objects of the invention can be achieved in various embodiments of the invention described herein.

One embodiment of the invention comprises an apparatus comprising a mobile cargo carrier, such as a wheeled cart or wagon, and means for releasably attaching the cargo carrier to a vehicle, such as an automobile. The apparatus comprises a cargo carrier having an upwardly extending elongate bar, a hitch for attachment to an automobile, and a coupling device for attaching the cargo carrier to the automobile hitch. The coupling device includes a hollow member sized and shaped to receive the elongate bar of the cargo carrier. The coupling device also includes a hand crank winch and cable or strap. The cable or strap is attached to the cargo carrier, and the using the hand crank, the winch lifts the cargo carrier off the ground with the bar moving upward telescopically within the hollow member of the coupling device. As such, the cargo carrier can be easily transported by the automobile. When a desired destination has been reached, the hand crank can be used to lower the cargo carrier back to the ground, and the carrier's elongate bar is removed from the hollow member of the coupling device. The coupling device can be released from the automobile hitch and stored within the automobile if desired.

A cargo carrier attachment system according to an embodiment of the invention comprises a hitch attachment apparatus adapted for releasable attachment to a vehicle hitch, a cargo carrier apparatus comprising a mobile cargo carrier and a support member attached to the mobile cargo carrier, and a coupling device adapted to releasably connect the hitch attachment apparatus and the cargo carrier apparatus. The coupling device comprises a first attachment member adapted to engage the hitch attachment apparatus, and a second attachment member adapted to engage the support member of the cargo carrier apparatus. The system includes means for elevating the cargo carrier apparatus from a grounded position, in which the mobile cargo carrier sits on a ground surface and an elevated position, in which the mobile cargo carrier is elevated above the ground surface.

According to another embodiment of the invention, the means for elevating the cargo carrier apparatus comprises a mechanical winch, an electrical winch, or a hoist.

According to another embodiment of the invention, the means for elevating the cargo carrier apparatus comprises a mechanical winch and a crank handle operatively connected to the winch, the mechanical winch operatively connected to the cargo carrier apparatus support member, whereby turning of the crank handle elevates the cargo carrier apparatus.

According to another embodiment of the invention, the mechanical winch is attached to the coupling device.

According to another embodiment of the invention, the support member of the cargo carrier apparatus is substantially L-shaped. The support member comprises a first elongate section and a second elongate section extending perpendicularly to the first elongate section. The first elongate section is attached to the mobile cargo carrier, and the second elongate section extends upwardly from the mobile cargo carrier.

According to another embodiment of the invention, the second attachment member of the coupling device is hollow and shaped and sized to receive the second elongate section of the cargo carrier apparatus support member therein.

According to another embodiment of the invention, the means for elevating the cargo carrier apparatus comprises a mechanical winch and a crank handle operatively connected to the winch. The mechanical winch is operatively connected to the cargo carrier apparatus support member, such as by a strap or cord. Turning of the crank handle pulls the second elongate section of the cargo carrier apparatus upwardly through the second attachment member of the coupling device.

According to another embodiment of the invention, the hitch attachment apparatus is substantially L-shaped. The hitch attachment apparatus comprises a first elongate section shaped and sized to be received in a receiving hitch mounted on a vehicle, and a second elongate section extending perpendicularly to the first elongate section. The second elongate section is substantially hollow and shaped and sized to receive the first attachment member of the coupling device therein.

According to another embodiment of the invention, the means for elevating the cargo carrier apparatus comprises a mechanical winch and a crank handle operatively connected to the winch. The mechanical winch is attached to the first attachment member and/or the second attachment member of the coupling device, and is operatively connected to the cargo carrier apparatus support member, such that turning of the crank handle elevates the cargo carrier apparatus.

According to another embodiment of the invention, a cargo carrier attachment system comprises a hitch attachment apparatus comprising a first elongate section and a second elongate section extending upwardly at an approximately ninety-degree angle from the first elongate section, the first elongate section adapted for releasable attachment to a vehicle hitch, a cargo carrier apparatus comprising a mobile cargo carrier and a support member attached to the mobile cargo carrier, the support member comprising a first elongate section and a second elongate section extending upwardly at an approximately ninety-degree angle from the first elongate section, the first elongate section attached to the cart, and a coupling device adapted to releasably connect the hitch attachment apparatus and the cargo carrier apparatus. The coupling device comprises a first attachment member adapted to engage the second elongate section of the hitch attachment apparatus, a second attachment member adapted to engage the second elongate section of the cargo carrier apparatus support member, and a winch operatively connected to the cargo carrier apparatus support member, such that turning of the winch elevates the cargo carrier apparatus from a grounded position, in which the mobile cargo carrier sits on a ground surface and an elevated position, in which the mobile cargo carrier resides at a predetermined position above the ground surface.

According to another embodiment of the invention, the winch is attached proximate the top edge of the first attachment member and/or the second attachment member of the coupling device.

According to another embodiment of the invention, the winch is a mechanical winch, and a crank handle is operatively connected to the mechanical winch, such that turning the crank handle elevates the cargo carrier apparatus.

According to another embodiment of the invention, the mobile cargo carrier comprises a cart comprising a body section adapted for carrying items therein, and a plurality of wheels attached to the body section for facilitating movement of the cart on the ground surface.

According to another embodiment of the invention, the first elongate section of the cargo carrier apparatus support member is attached to an under side of the body section of the cart, and the second elongate section of the cargo carrier apparatus support member extends upwardly from first elongate section.

According to another embodiment of the invention, the second attachment member of the coupling device is hollow and shaped and sized to receive the second elongate section of the cargo carrier apparatus support member therein.

According to another embodiment of the invention, the first elongate section and the second elongate section of the hitch attachment apparatus are substantially hollow. The first elongate section is shaped and sized to be positioned in a vehicle receiving hitch, and the second elongate section is shaped and sized to receive the first attachment member of the coupling device therein.

According to another embodiment of the invention, turning of the crank handle pulls the second elongate section of the cargo carrier apparatus upwardly through the second attachment member of the coupling device so that the cart can be elevated to the elevated position.

According to another embodiment of the invention, the second elongate section of the cargo carrier apparatus has at least one through hole formed therein and the second attachment member of the coupling device has at least one through hole formed therein such that the through holes are aligned when the cargo carrier apparatus is in the elevated position. At least one fastening member can be positioned in the aligned through holes, so that the cargo carrier apparatus is securely maintained in the elevated position.

Another embodiment of the invention comprises a method of attaching a mobile cargo carrier, such as a wheeled cart or wagon, to a motor vehicle that includes providing a motor vehicle with a hitch attached thereto, and a cargo carrier attachment system. The cargo carrier attachment system comprises a hitch attachment apparatus comprising a first elongate section and a second elongate section extending upwardly at an approximately ninety-degree angle from the first elongate section. The first elongate section adapted for releasable attachment to the hitch. The cargo carrier apparatus comprises a mobile cargo carrier and a support member attached to the mobile cargo carrier. The support member comprises a first elongate section attached to the mobile cargo carrier, and a second elongate section extending upwardly at an approximately ninety-degree angle from the first elongate section. A coupling device is adapted to releasably connect the hitch attachment apparatus and the cargo carrier apparatus. The coupling device comprises a first attachment member adapted to engage the second elongate section of the hitch attachment apparatus, and a second attachment member adapted to engage the second elongate section of the cargo carrier apparatus support member. A winch is operatively connected to the cargo carrier apparatus support member, such that turning of the winch elevates the cargo carrier apparatus from a grounded position, in which the cart sits on a ground surface, and an elevated position, in which the cart resides at a predetermined position above the ground surface. The coupling device is positioned above the hitch attachment apparatus and the cargo carrier apparatus such that the first attachment member of the coupling device is aligned with the second elongate section of the hitch attachment apparatus and second attachment member of the coupling device is aligned with the second elongate section of the cargo carrier apparatus support member. The first attachment member of the coupling device is positioned into the second elongate section of the hitch attachment apparatus, and the second elongate section of the cargo carrier apparatus support member is positioned into the second attachment member of the coupling device. The winch is operatively connected to the cargo carrier apparatus support member, and is turned to elevate the cargo carrier apparatus from the grounded position to the elevated position.

According to another embodiment of the invention, the hitch comprises a receiving hitch, and the first elongate section of the hitch attachment apparatus is positioned into the receiving hitch. A fastener, such as a bolt, is positioned through aligned through holes formed in the first elongate section of the hitch attachment apparatus and the receiving hitch.

DETAILED DESCRIPTION OF PREFERRED EMBODIMENTS OF INVENTION

Figure 1:
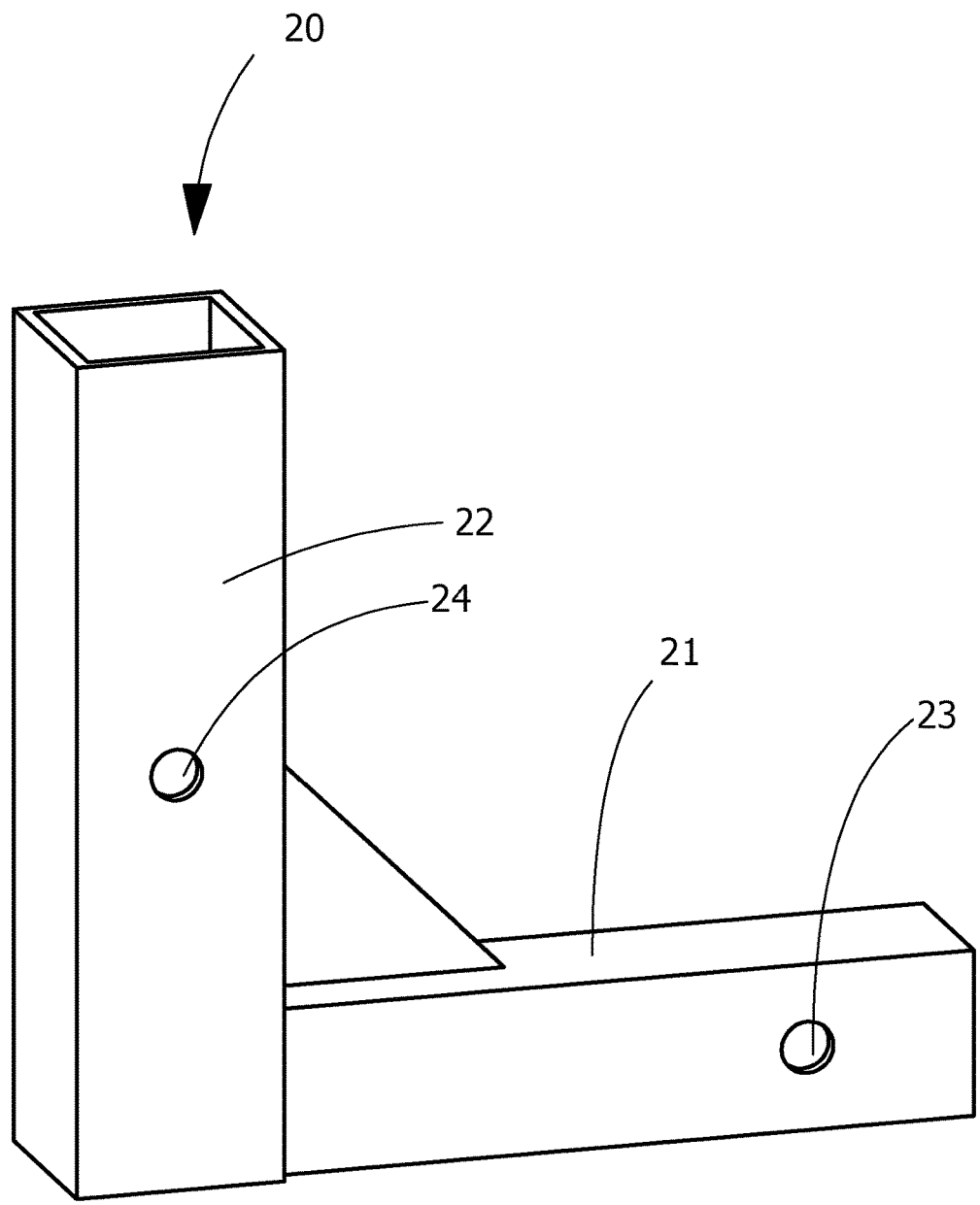
FIG. 1 is a perspective view of a hitch attachment apparatus according to a preferred embodiment of the invention.

A cargo carrier attachment system according to a preferred embodiment of the invention is illustrated in FIGS. 1-31, and shown generally at reference numeral 10. The system 10 comprises a hitch attachment apparatus 20, a cargo carrier apparatus 30, and a coupling device 40 connecting the cargo carrier attachment apparatus 30 and the hitch attachment apparatus 20.

Figure 2:
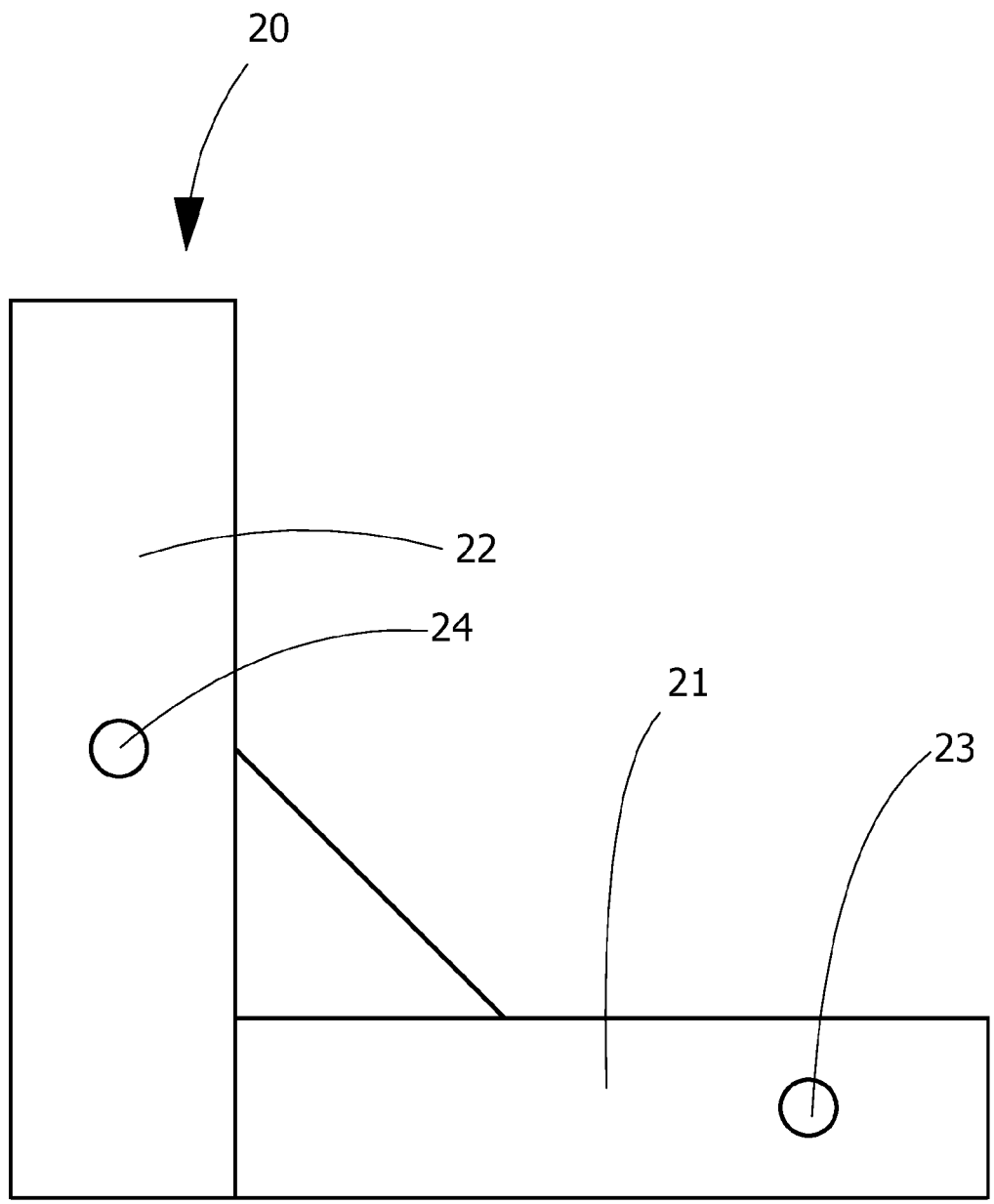
FIG. 2 is a side view of the apparatus of FIG. 1.
Figure 7:
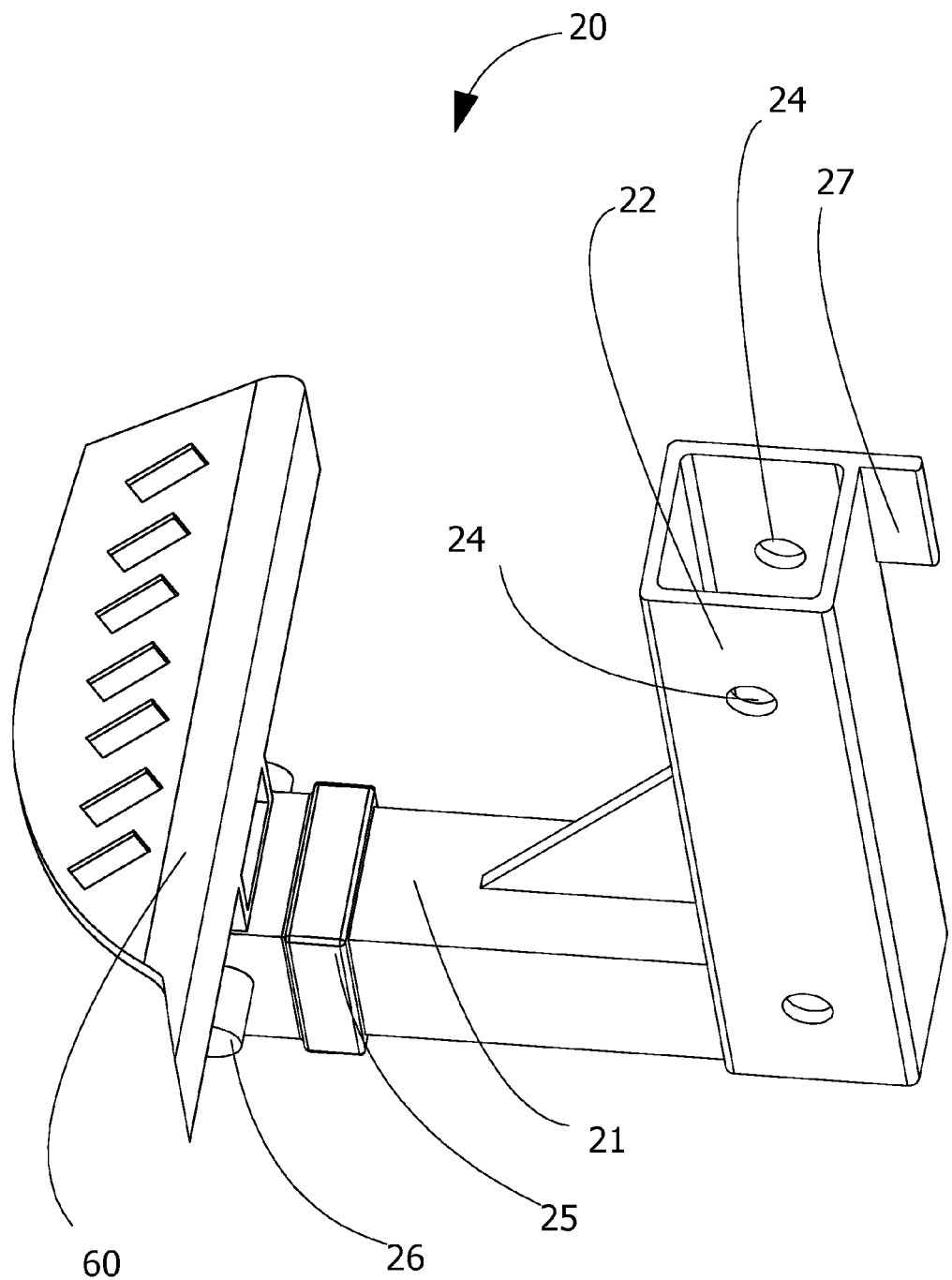
FIG. 7 is an environmental perspective view of a hitch attachment apparatus according to a preferred embodiment of the invention.
Figure 8:
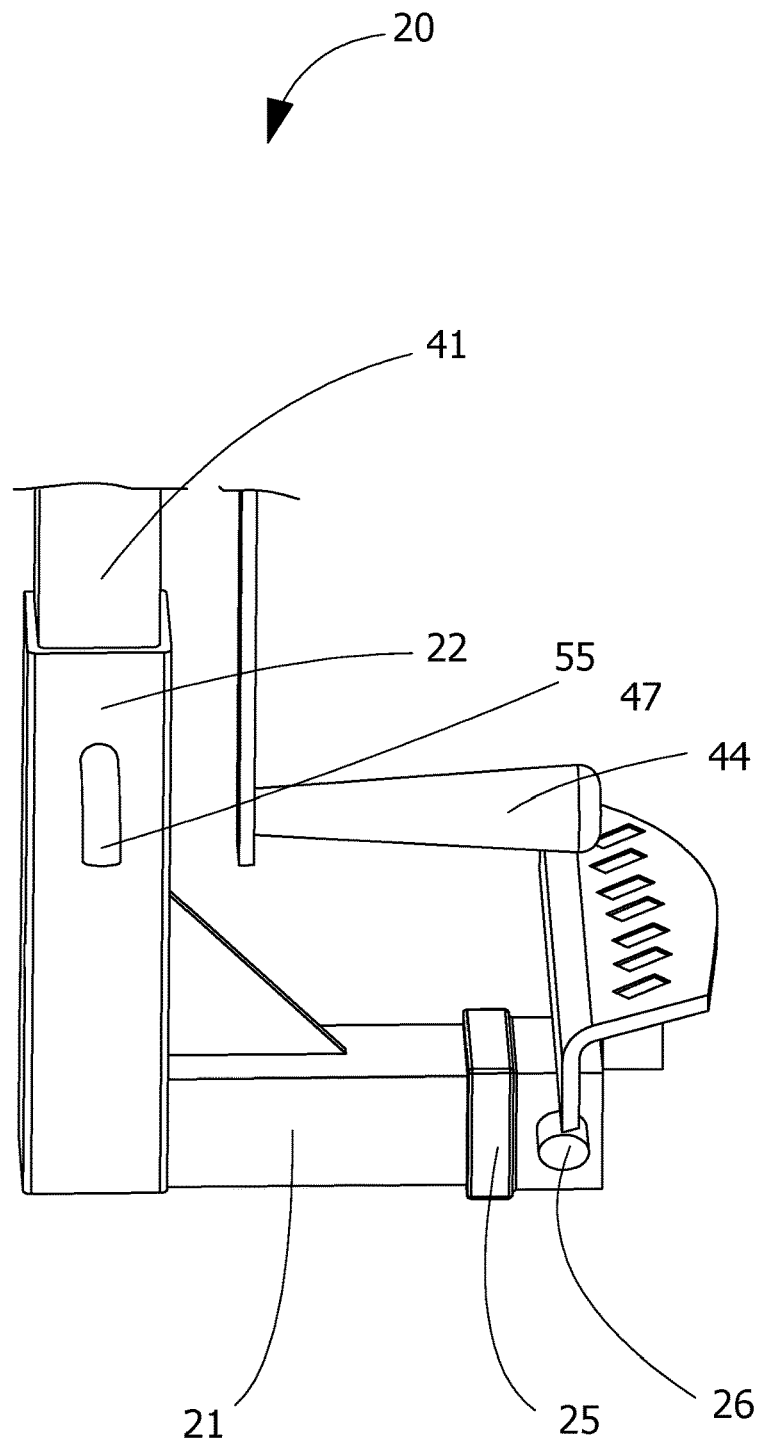
FIG. 8 is another environmental perspective view of the hitch attachment apparatus of FIG. 7.
Figure 9:
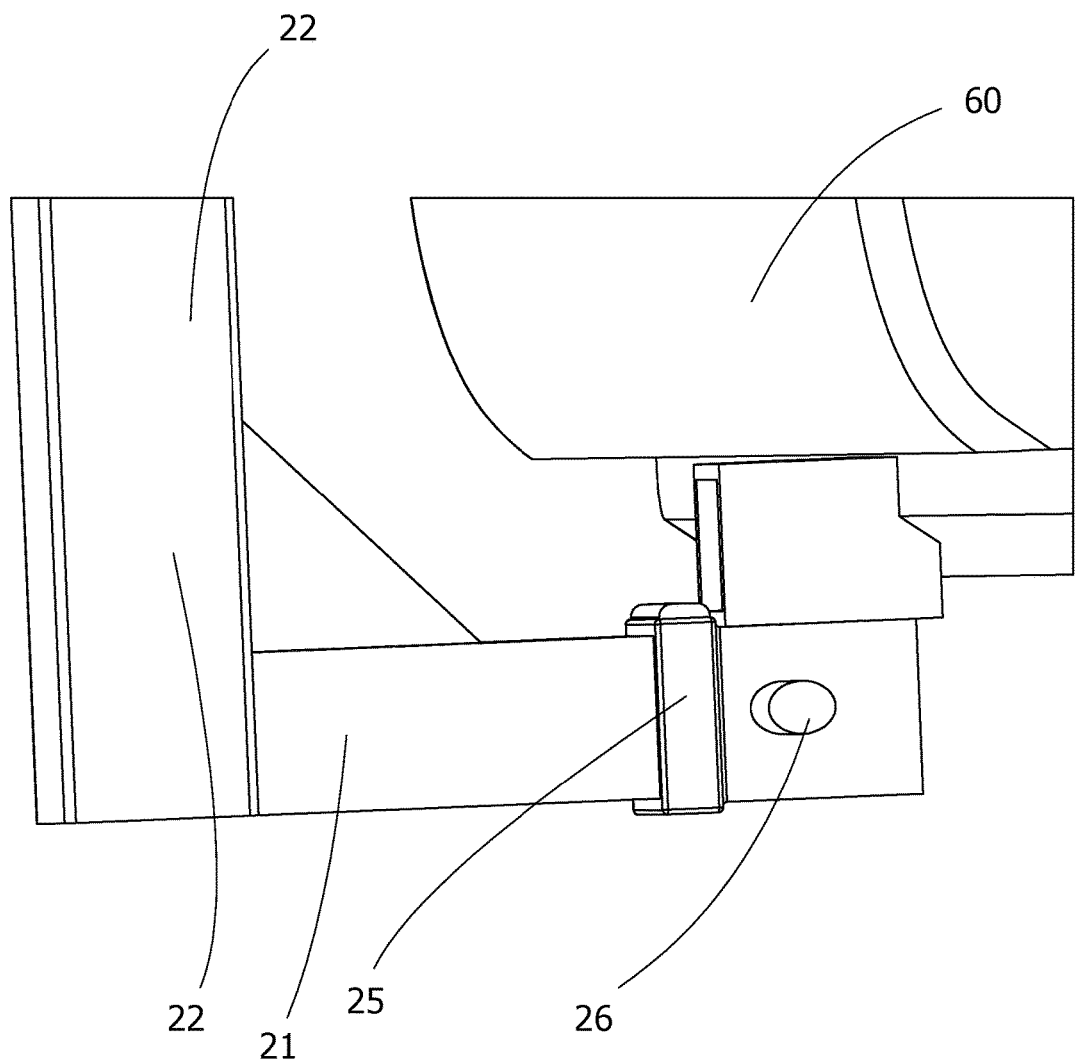
FIG. 9 is another environmental perspective view of the hitch attachment apparatus of FIG. 7.
Figure 10:
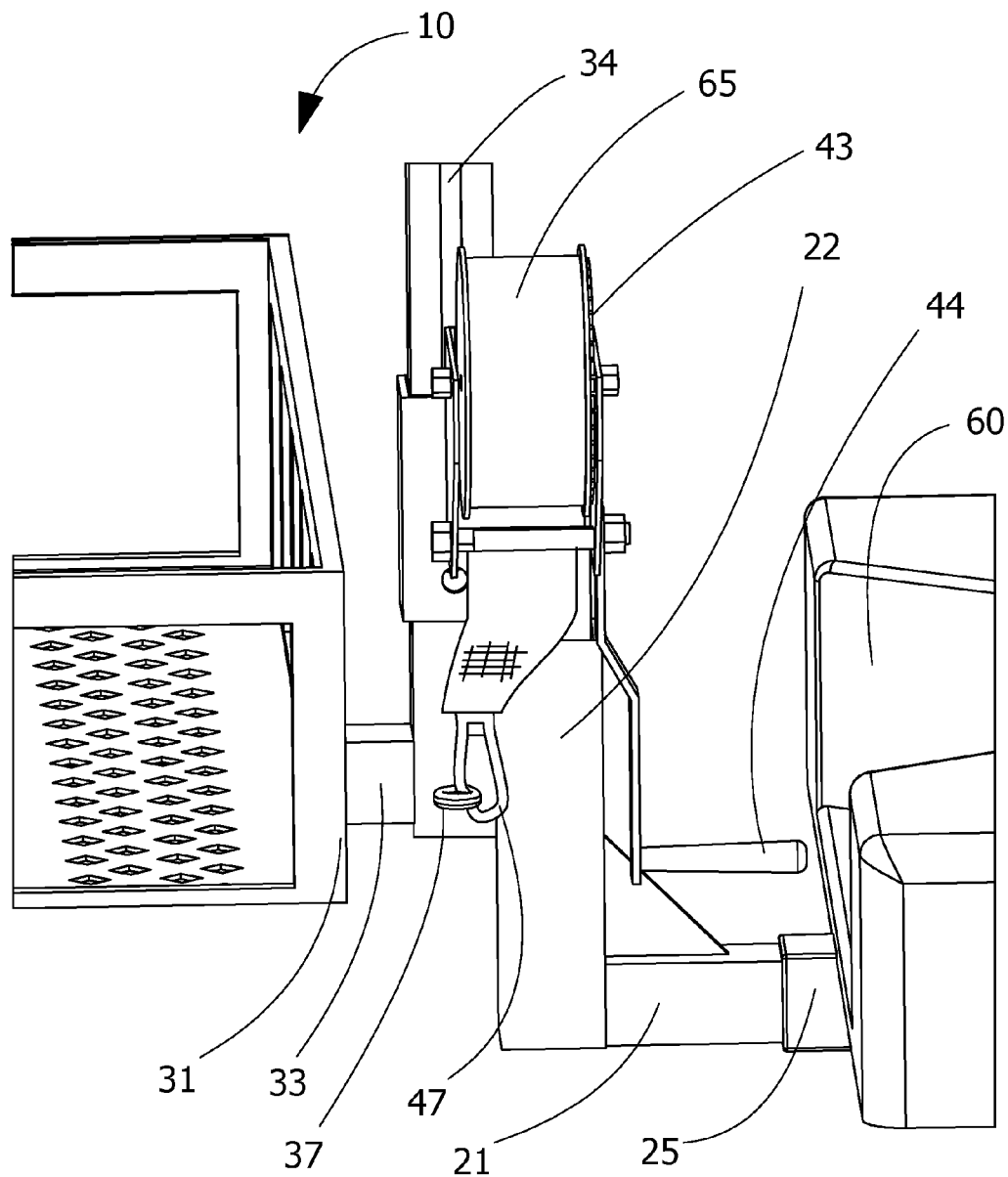
FIG. 10 is a perspective view of a cargo carrier attachment system according to a preferred embodiment of the invention.
Figure 11:
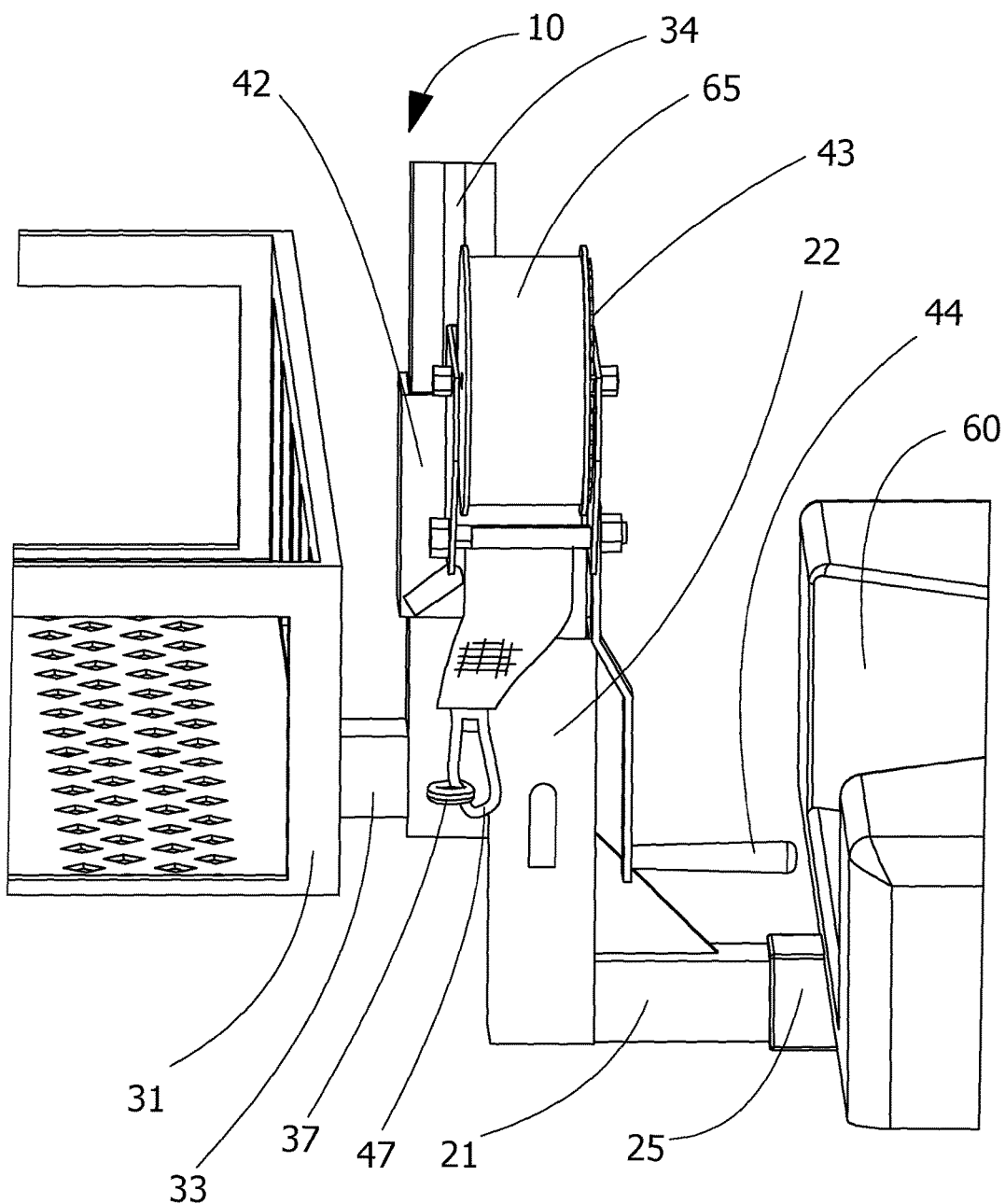
FIG. 11 is another perspective view of the cargo carrier attachment system of FIG. 10.

As shown in FIGS. 1 and 2, the hitch attachment apparatus 20 comprises a substantially hollow L-shaped member comprised of a first elongate section 21 extending horizontally, and a second elongate section 22 extending upwardly at approximately a ninety-degree angle from the first section 21. Preferably, the elongate sections 21, 22 are comprised of square metal tubing. Through holes 23 are formed in opposite sides of the horizontal section 21, and through holes 24 are likewise formed in opposite sides of the vertical section 22, as shown in FIGS. 1, 2 and 7. The horizontal section 21 is shaped and sized to fit into and engage a receiving hitch 25 mounted on a motor vehicle, such as a truck 60, as shown in FIG. 9. The horizontal section 21 can be inserted into the receiving hitch 25 such that the through holes 23 are aligned with holes in the receiving hitch 25. A fastening member such as a bolt 26 can be positioned through the holes in the receiving hitch 25 and the through holes 23 of the horizontal section 21 to attach the hitch attachment apparatus 20 to the vehicle hitch 25, as shown in FIGS. 7-9.

Figure 3:
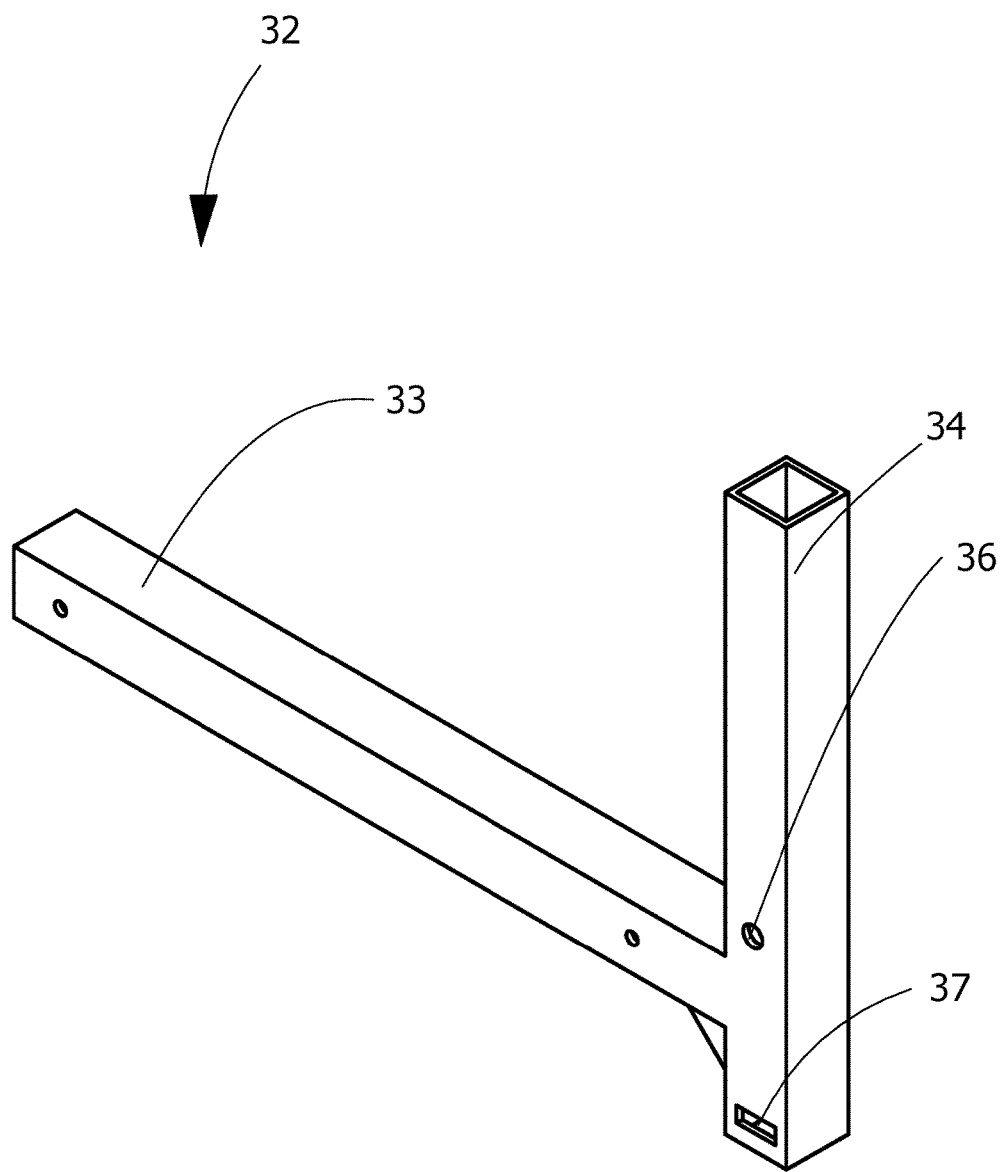
FIG. 3 is a cargo carrier support apparatus according to a preferred embodiment of the invention.
Figure 4:
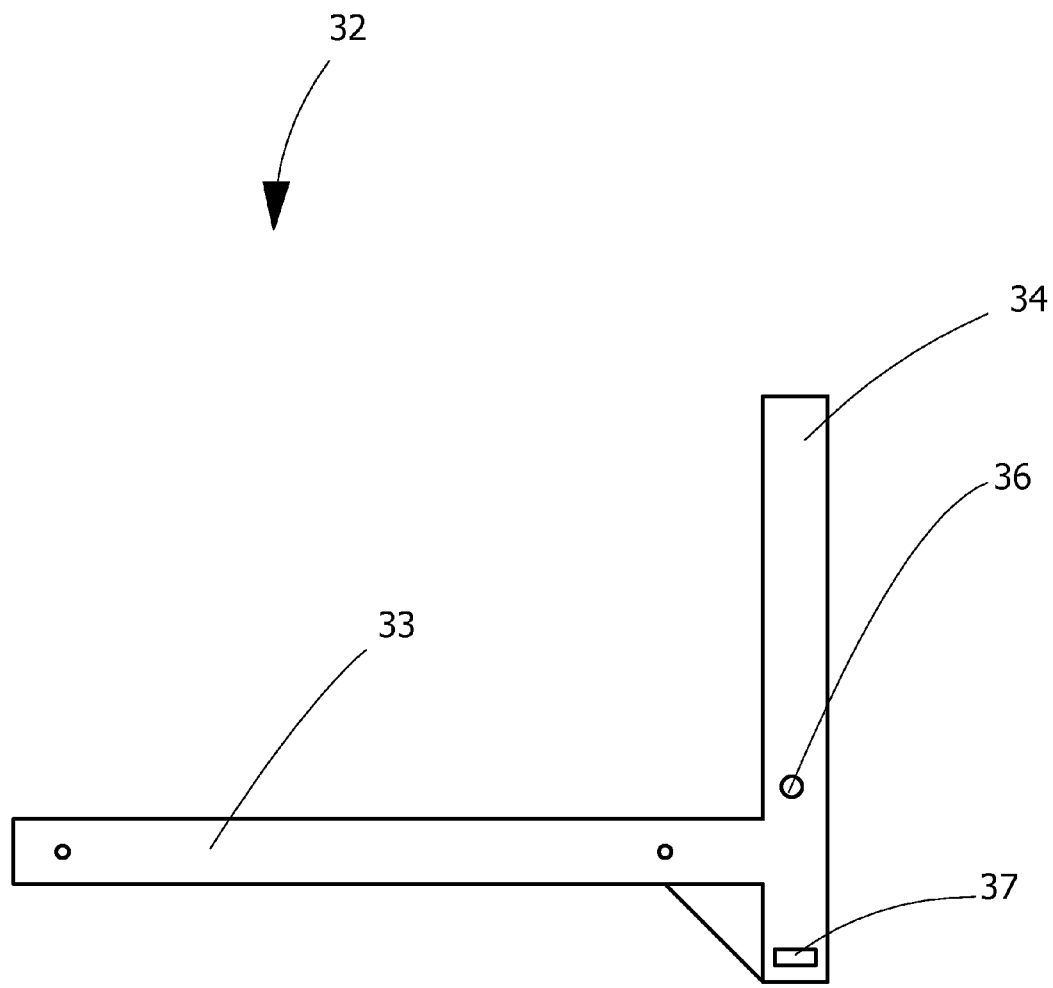
FIG. 4 is a side view of the apparatus of FIG. 3.
Figure 13:
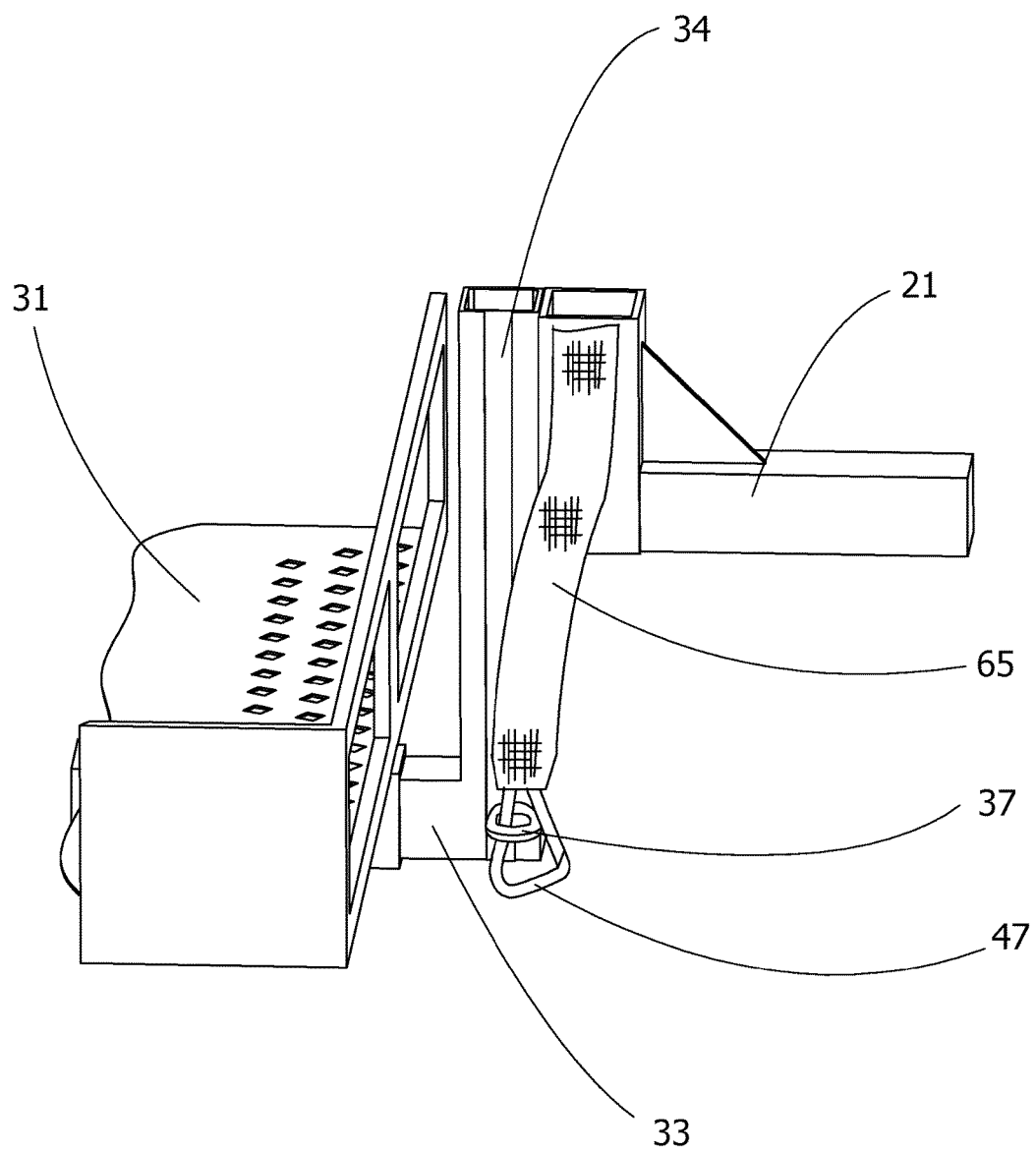
FIG. 13 is a partial perspective view of the cargo carrier attachment system of FIG. 10.
Figure 14:
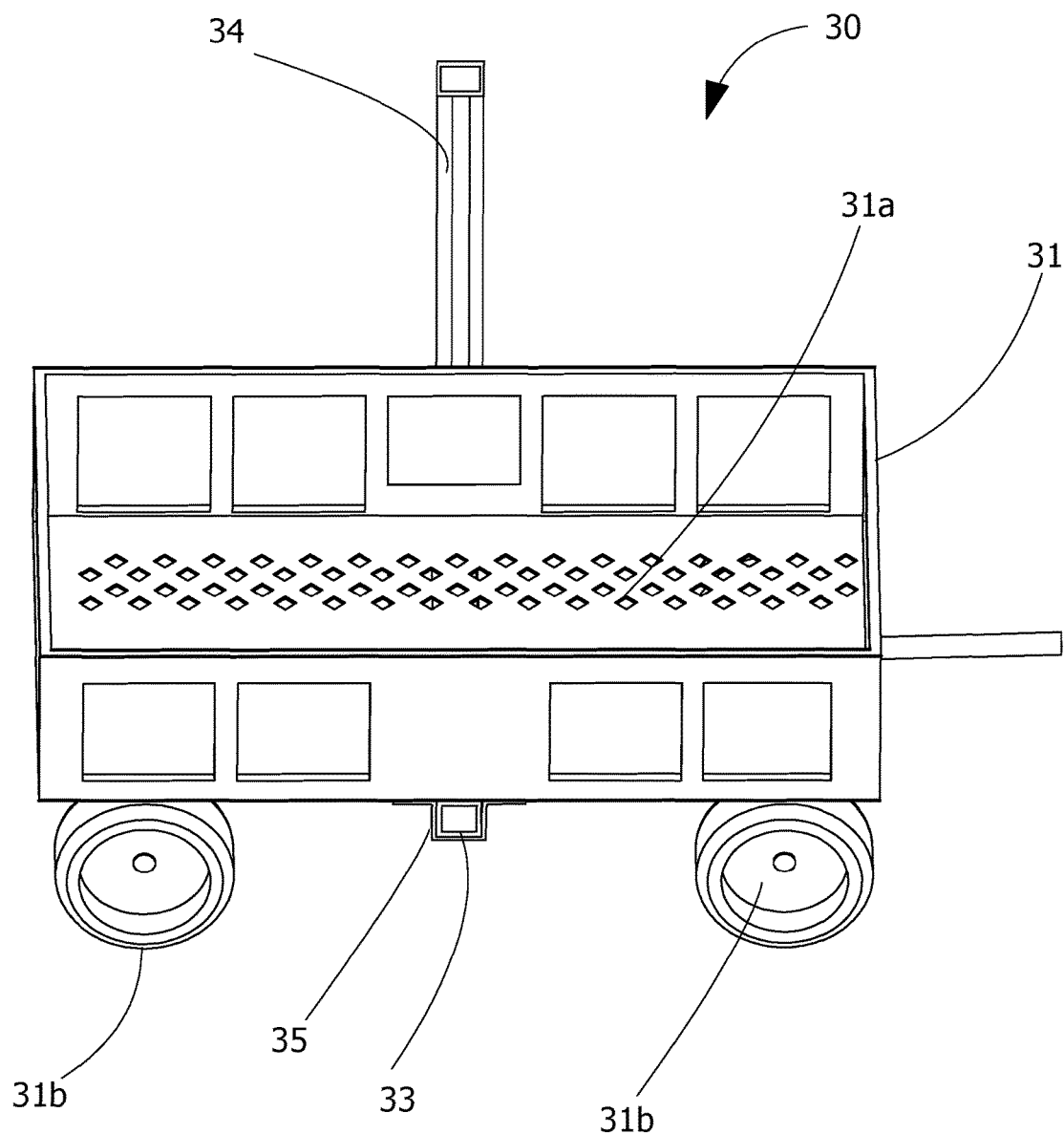
FIG. 14 is a perspective view of a cargo carrier apparatus according to a preferred embodiment of the invention.
Figure 15:
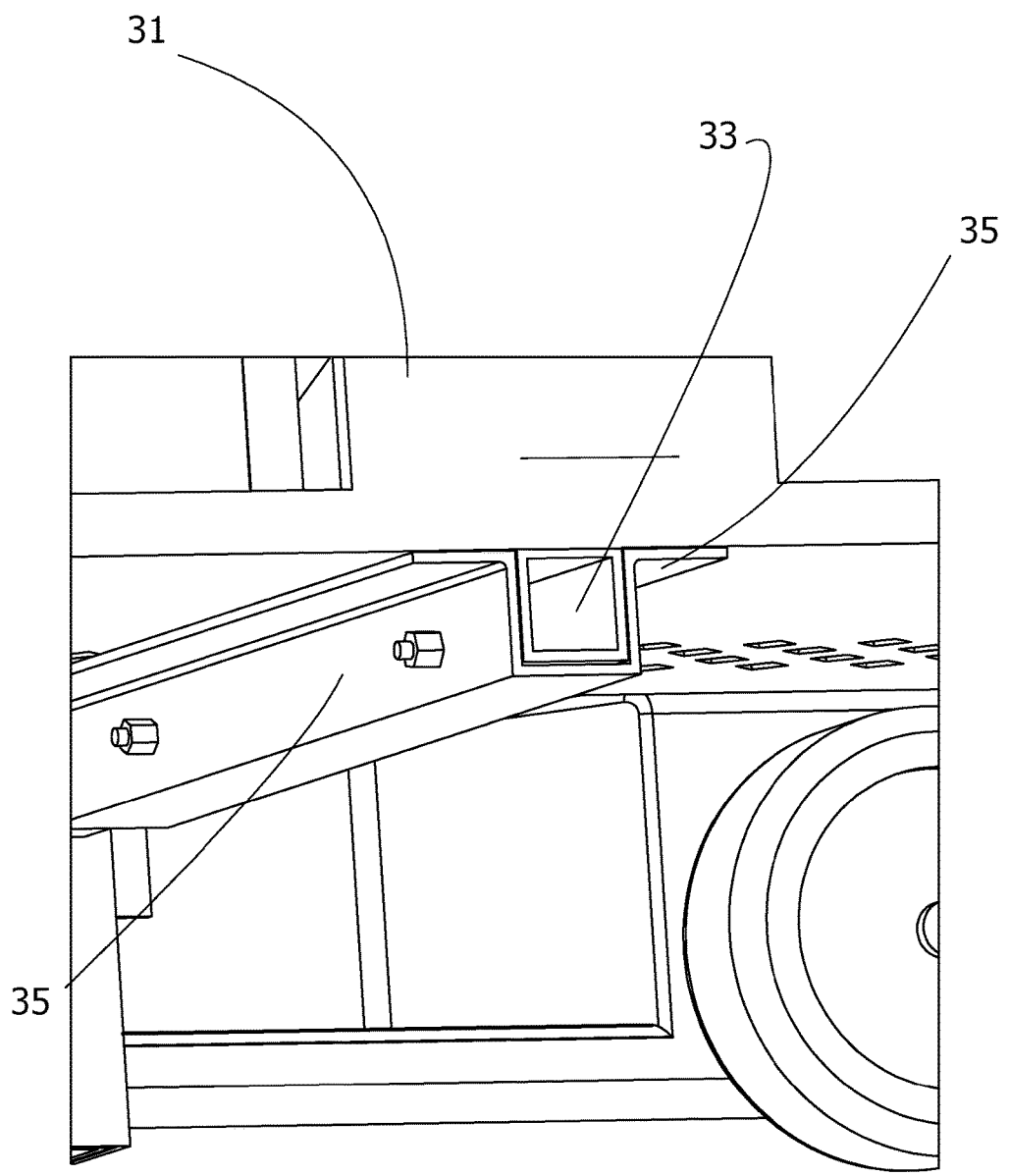
FIG. 15 is a partial perspective view of the cargo carrier apparatus of FIG. 14.
Figure 16:
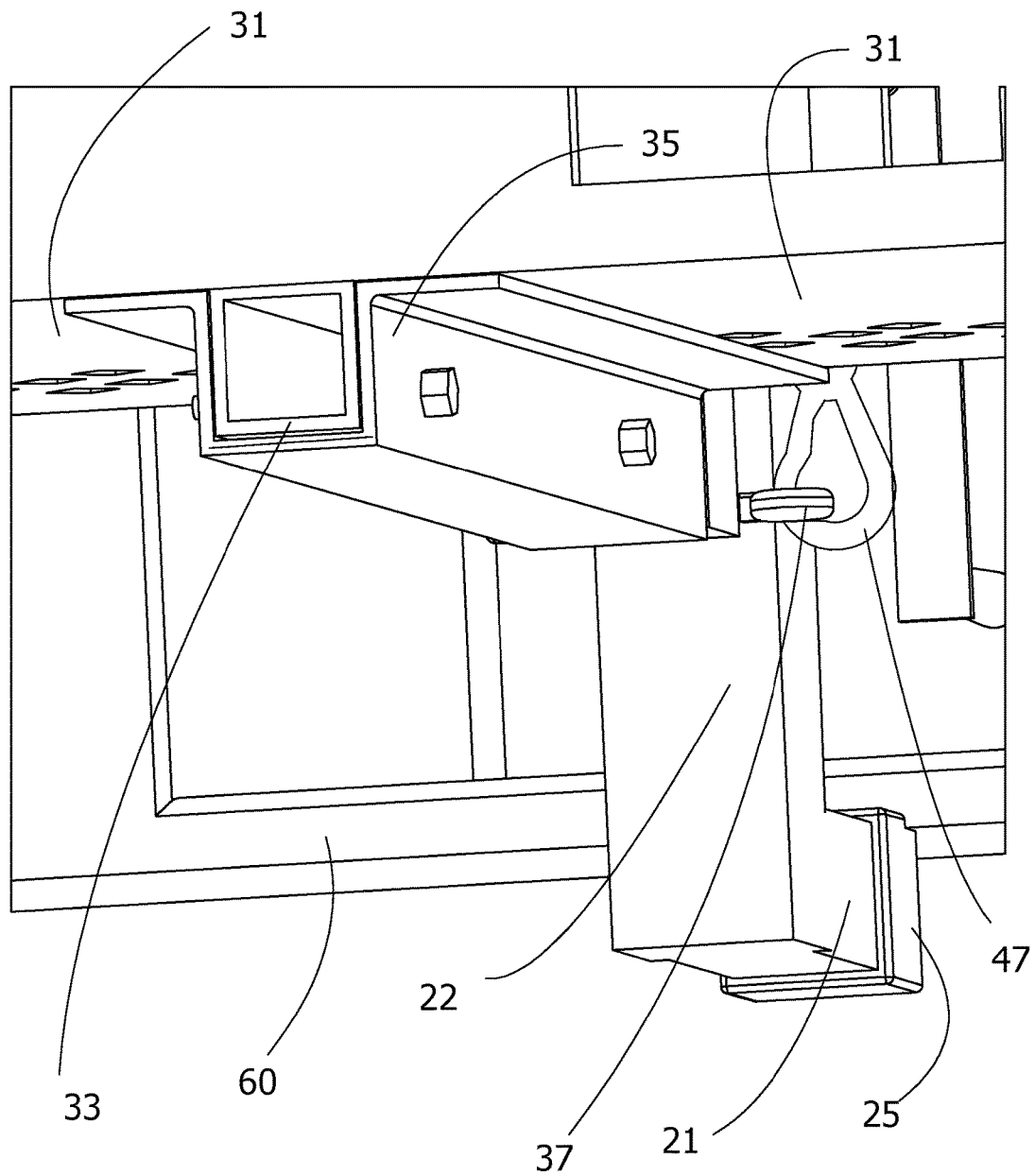
FIG. 16 another partial perspective view of the cargo carrier apparatus of FIG. 14.
Figure 17:
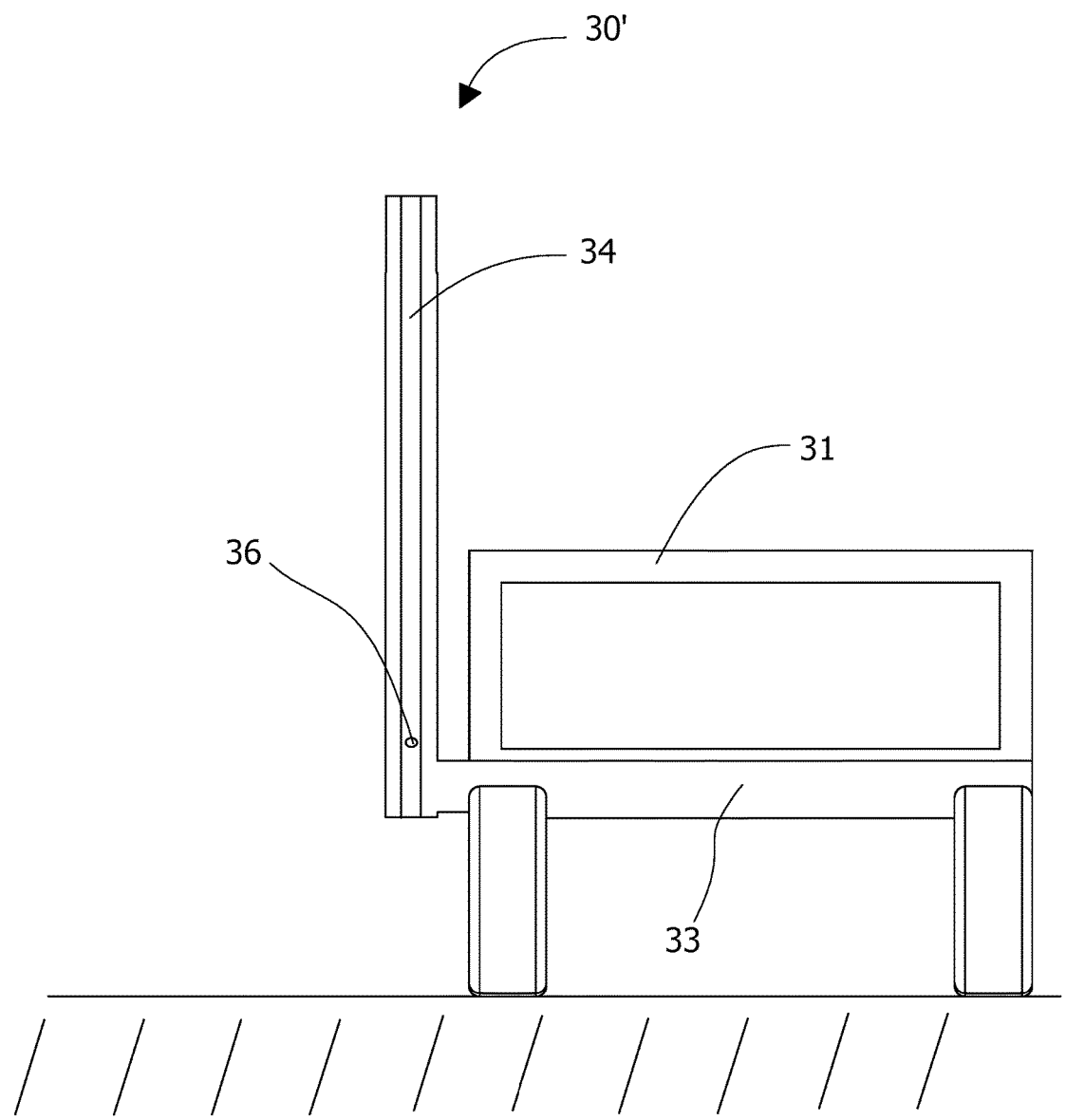
FIG. 17 is a side elevation of a cargo carrier apparatus according to another preferred embodiment of the invention.
Figure 19:
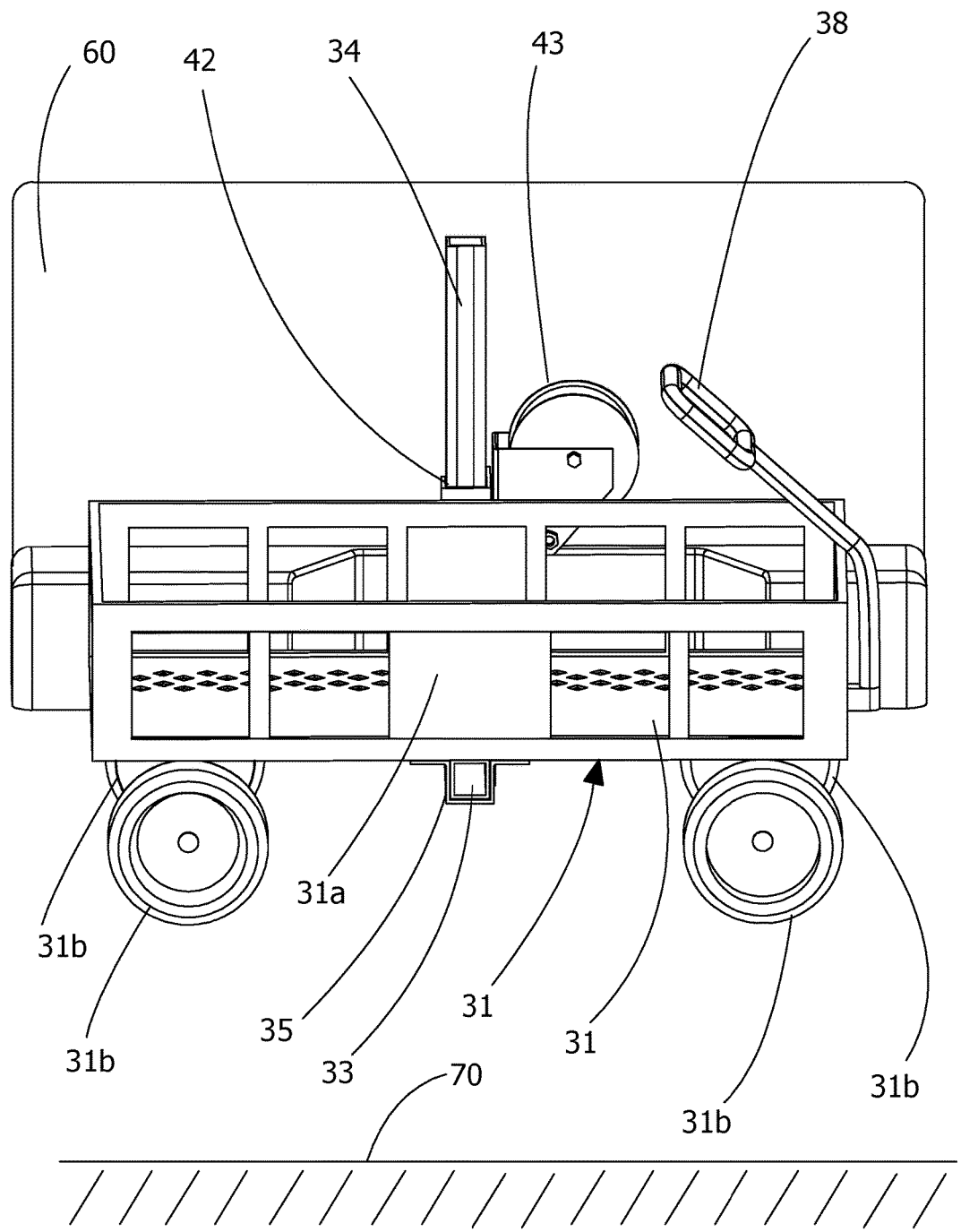
FIG. 19 is another perspective view of the cargo carrier attachment system of FIG. 10.

As shown in FIGS. 3, 4 and 14, the cargo carrier apparatus 30 comprises a mobile cargo carrier, such as a wheeled cart 31, and an L-shaped support member 32 attached to the cart 31. The cart 31 comprises a body section 31a for carrying items therein, and four wheels 31b attached to the body section 31a for facilitating movement of the cart 31 on a ground surface. The body section 31a can be comprised of a substantially rectangular base and a substantially rectangular sidewall extending upwardly from the base, as shown in FIG. 14. The support member 32 comprises a first elongate section 33 extending horizontally, and a second elongate section 34 extending vertically at approximately a ninety-degree angle from the first section 33, as shown in FIGS. 3 and 4. Preferably, the elongate sections 33, 34 are comprised of square metal tubing. Through holes 36 are formed in the vertical section 34, as shown in FIGS. 3 and 4. The support member 32 includes a void that can receive a fastening member. As shown in FIGS. 3 and 4, the void can be an aperture 37 formed at the bottom of the vertical section 34. Alternatively, the void can be a ring 37 extending outwardly from the bottom of the vertical section 34, as shown in FIGS. 10-13. The horizontal section 33 is attached to the cart 31. The horizontal section 33 can be positioned within a receiving member such as a bracket 35 mounted to the underside of the cart 31, as shown in FIGS. 15 and 16. In an alternative embodiment, shown at reference numeral 30' in FIG. 17, the cargo carrier apparatus does not include the bracket 35 and the horizontal section 33 can be attached to the underside of the cart 31 by welding. When the support member 32 is attached to the cart 31, the vertical section 34 extends upwardly from the cart 31, as shown in FIGS. 14 and 17. The cart 31 can include a handle 38, as shown in FIG. 19.

Figure 5:
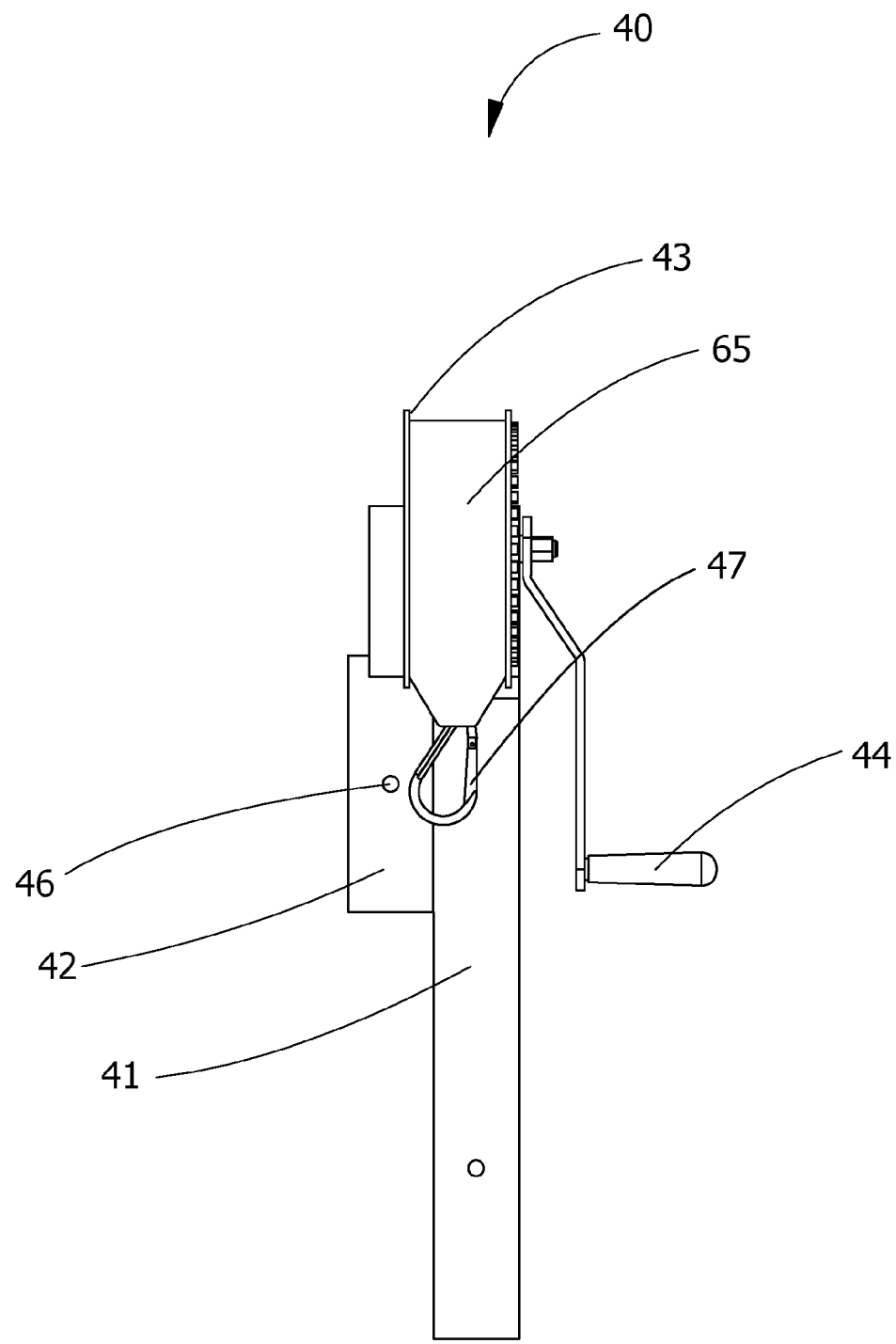
FIG. 5 is a front elevation of a coupling device according to a preferred embodiment of the invention.
Figure 6:
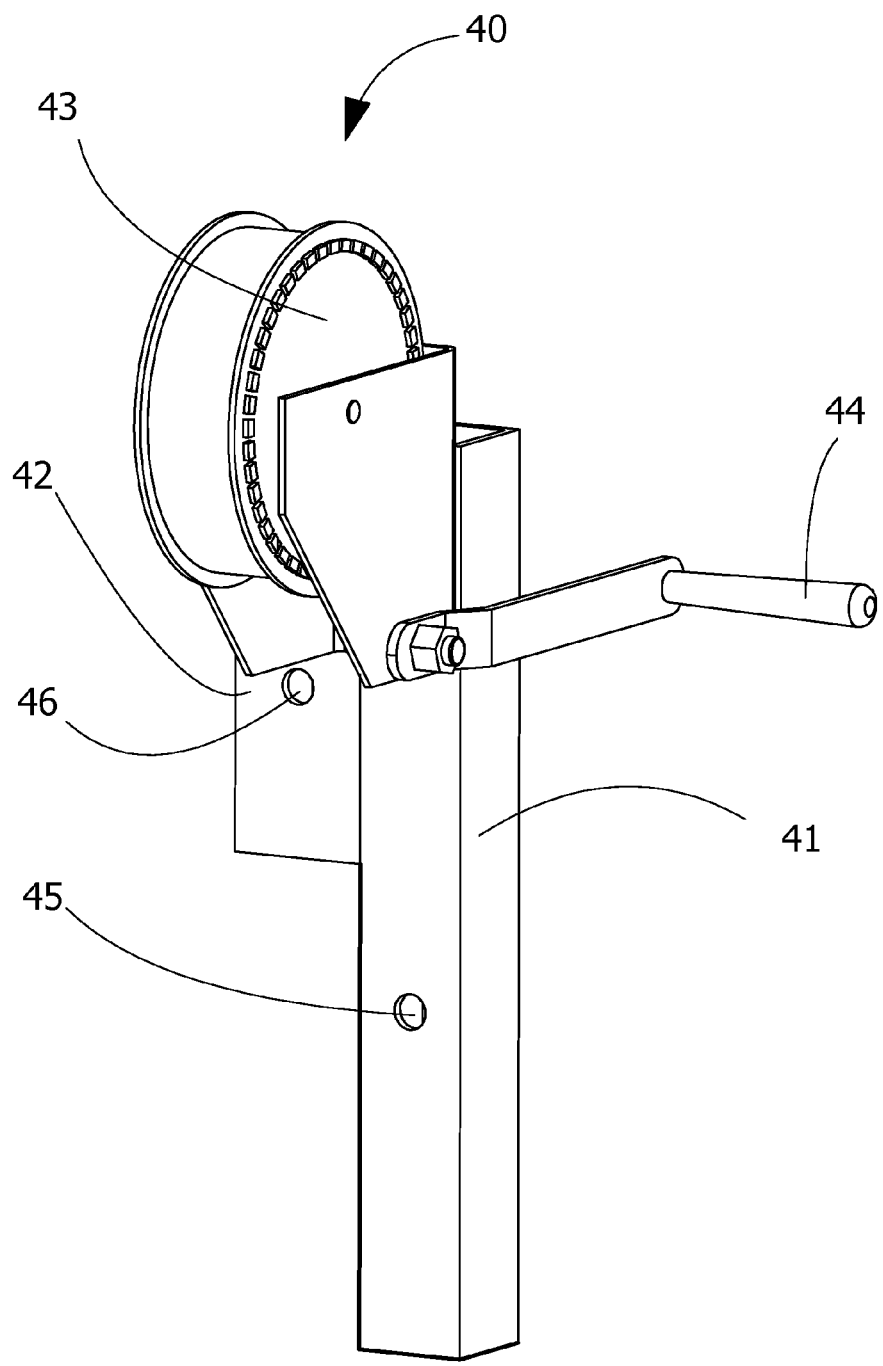
FIG. 6 is a perspective view of the coupling device of FIG. 5.
Figure 22:
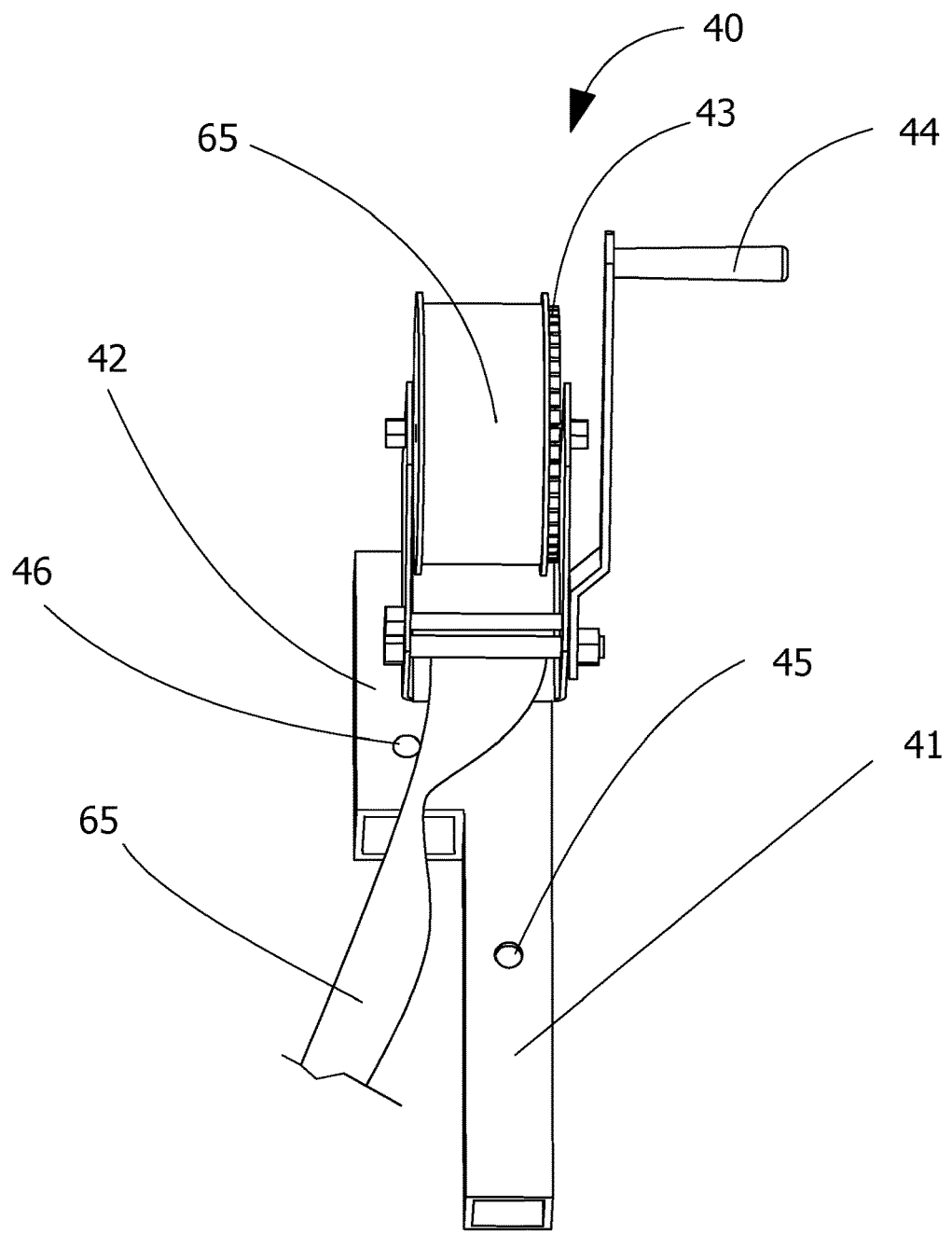
FIG. 22 is another perspective view of the coupling device of FIG. 5.

The coupling device 40, shown in FIGS. 5, 6 and 22, comprises means for releasably connecting the hitch attachment apparatus 20 and the cargo carrier apparatus 30, and means for elevating the cargo carrier apparatus 30. The means for releasably connecting the hitch attachment apparatus 20 and the cargo carrier apparatus 30 can comprise a pair of elongate members 41, 42 attached to each other, as shown in FIGS. 5 and 6. The means for elevating the cargo carrier attachment apparatus can comprise a mechanical winch 43 mounted to the attached elongate members 41, 42 proximate the top end of the elongate members 41, 42. Each of the elongate members 41, 42 are substantially hollow and open at opposite ends. Preferably, the elongate members 41, 42 are comprised of square metal tubing. The elongate members 41, 42 can be attached to each other by welding or other suitable attachment means. The winch 43 can be welded to the elongate members 41, 42. In an alternative embodiment, the winch 43 can be releasably attached to the elongate members 41, 42 such as by bolting the winch 43 to a plate that is welded to the elongate members 41, 42. One elongate member 41 is substantially longer than the other member 42, as shown in FIGS. 5 and 6. A crank handle 44 is connected to the winch 43, and a strap 65 is wrapped around and connected to the winch 43. The strap 65 is preferably made of a high strength material. Alternatively, a cable can be used in place of the strap 65. A fastener such as a locking hook 47 is attached at the end of the strap 65, as shown in FIG. 5. Each of the elongate members 41, 42 has through holes 45, 46 formed therein. Alternatively, the means for elevating the cargo carrier apparatus 30 can comprise an electric winch. In another alternative embodiment, the means for elevating the cargo carrier apparatus can comprise a hoist.

The system 10 can have the following preferred dimensions. The horizontal section 21 of the hitch attachment apparatus 20 preferably has a length of ten inches and a width of two inches. The vertical section 22 preferably has a length of ten inches and a diameter of 2.5 inches. The horizontal section 33 of the cargo carrier apparatus 30 preferably has a length of twenty-three inches, and a diameter of two inches. The vertical section 34 preferably has a length of twenty-six inches and a diameter of two inches. First elongate member 41 of the coupling device 40 preferably has a length of sixteen inches and a diameter of two inches. The second elongate member 42 of the coupling device 40 preferably has a length of eight inches and a diameter of 2.5 inches.

Figure 23:
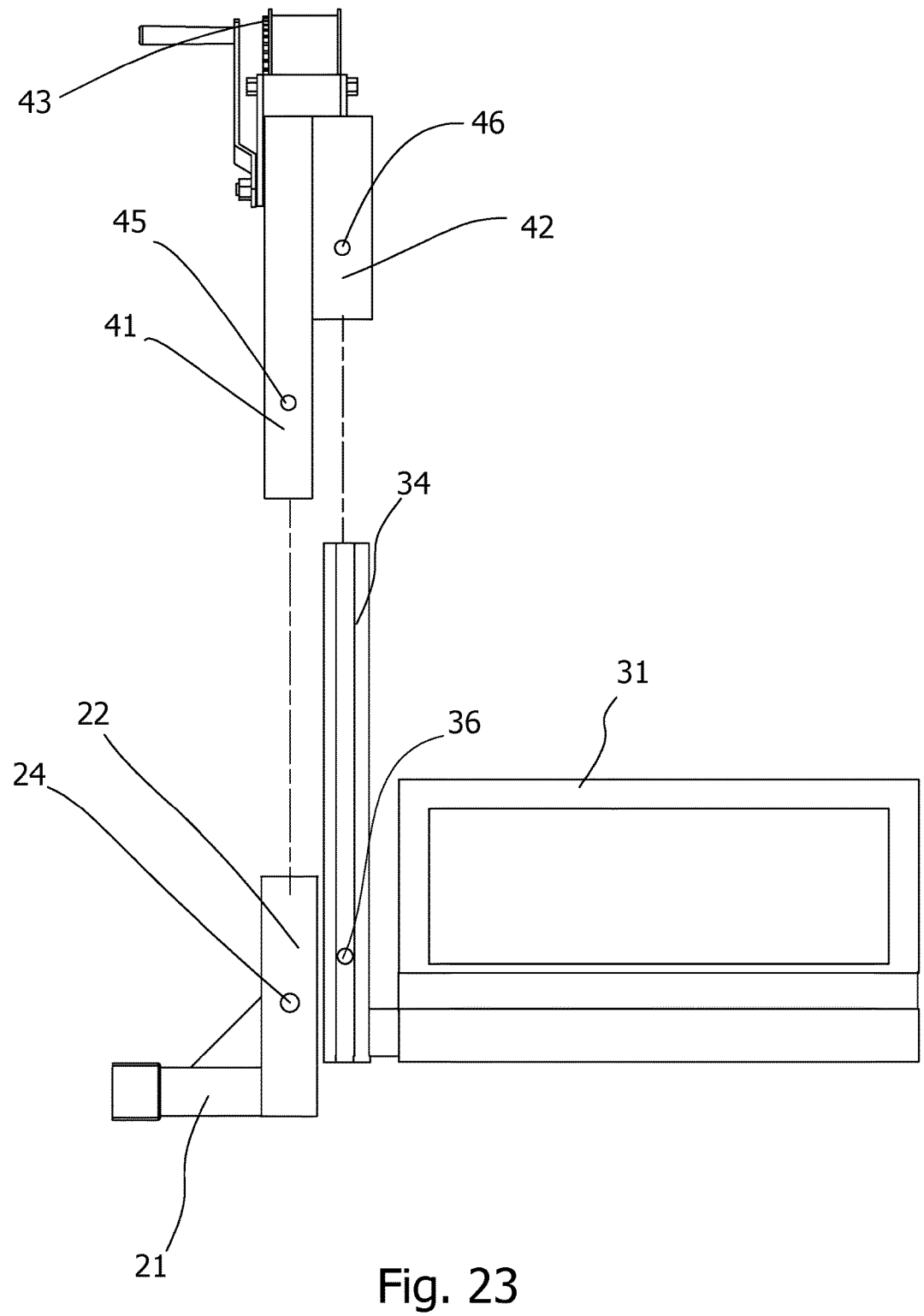
FIG. 23 is a schematic view of the cargo carrier attachment system of FIG. 10.

In a method of using the system 10 according to a preferred embodiment of the invention, the cart 31 is positioned on a ground surface 70 such that the vertical support bar 34 of the cargo carrier apparatus 40 is positioned against the vertical section 22 of the hitch attachment apparatus 20, as shown in FIG. 23. A flange 27 extending outwardly from a corner of the vertical section 22 of the hitch attachment apparatus 20, shown in FIG. 7, aids in so positioning the cargo carrier support bar 34 against the hitch attachment vertical section 22.

Figure 24:
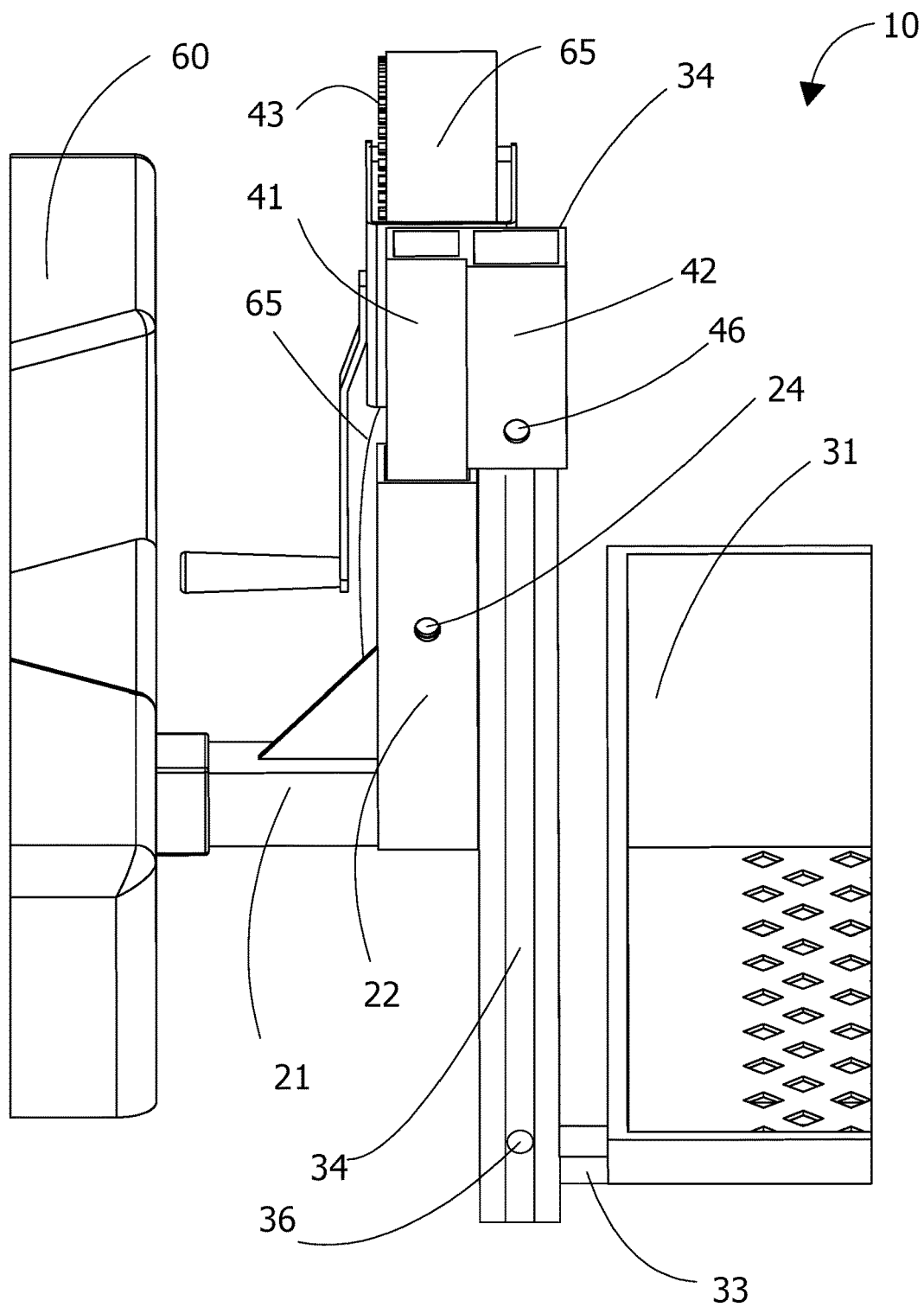
FIG. 24 is another perspective view of the cargo carrier attachment system of FIG. 10.

The coupling device 40 is positioned above the vertical cargo carrier support bar 34 and the hitch attachment vertical section 22, as shown in FIG. 23. The first elongate member 41 of the coupling device 40 is slid into the hitch attachment vertical section 22, and the second elongate member 42 receives the vertical section 34 of the cargo carrier support member 32, as illustrated by FIGS. 23 and 24. The locking hook 47 is positioned in the aperture 37 of the cargo carrier support member 32, as shown in FIG. 13.

The through holes 45 of the first elongate member 41 of the coupling device 40 align with the through holes 24 of the hitch attachment vertical section 22. A bolt 55 is positioned through the aligned hitch attachment through holes 24 and the coupling device through holes 45.

Figure 12:
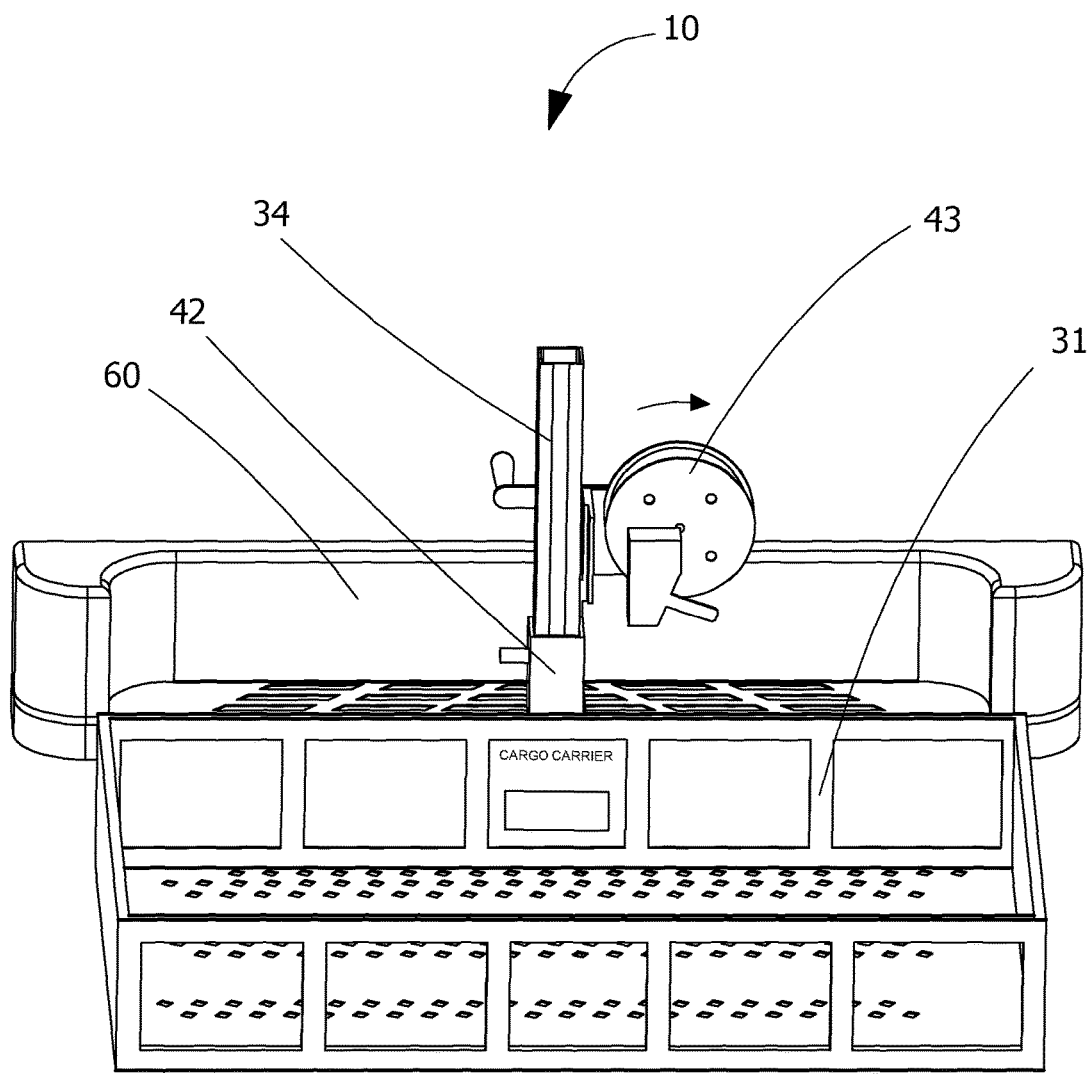
FIG. 12 is another perspective view of the cargo carrier attachment system of FIG. 10.

The user turns the crank handle 44 clockwise, as shown in FIG. 12, causing the winch 43 to raise the cart 31 off the ground via the strap 45 pulling the cargo carrier support member 32 upward. The horizontal section 33 of the cargo carrier support member 32 provides structural support to the cart 31 as it is being lifted off the ground. Tape having a relatively smooth surface, such as the ultra high molecular weight polyethylene tape sold by Peachtree Woodworking Supply Inc. under the name SLICK TAPE, can be positioned on the interior of the receiving member 42 and on the exterior of the cargo carrier vertical support bar 34 to facilitate sliding movement of the vertical section 34 of the cargo carrier support member 32 within the receiving member 42 of the coupling device 40. The winch 43 can raise the cart 31 with items left inside the cart 31, thereby eliminating the need to unload items from the cart 31 prior to attaching the cart 31 to the truck 60 for transport.

Figure 18:
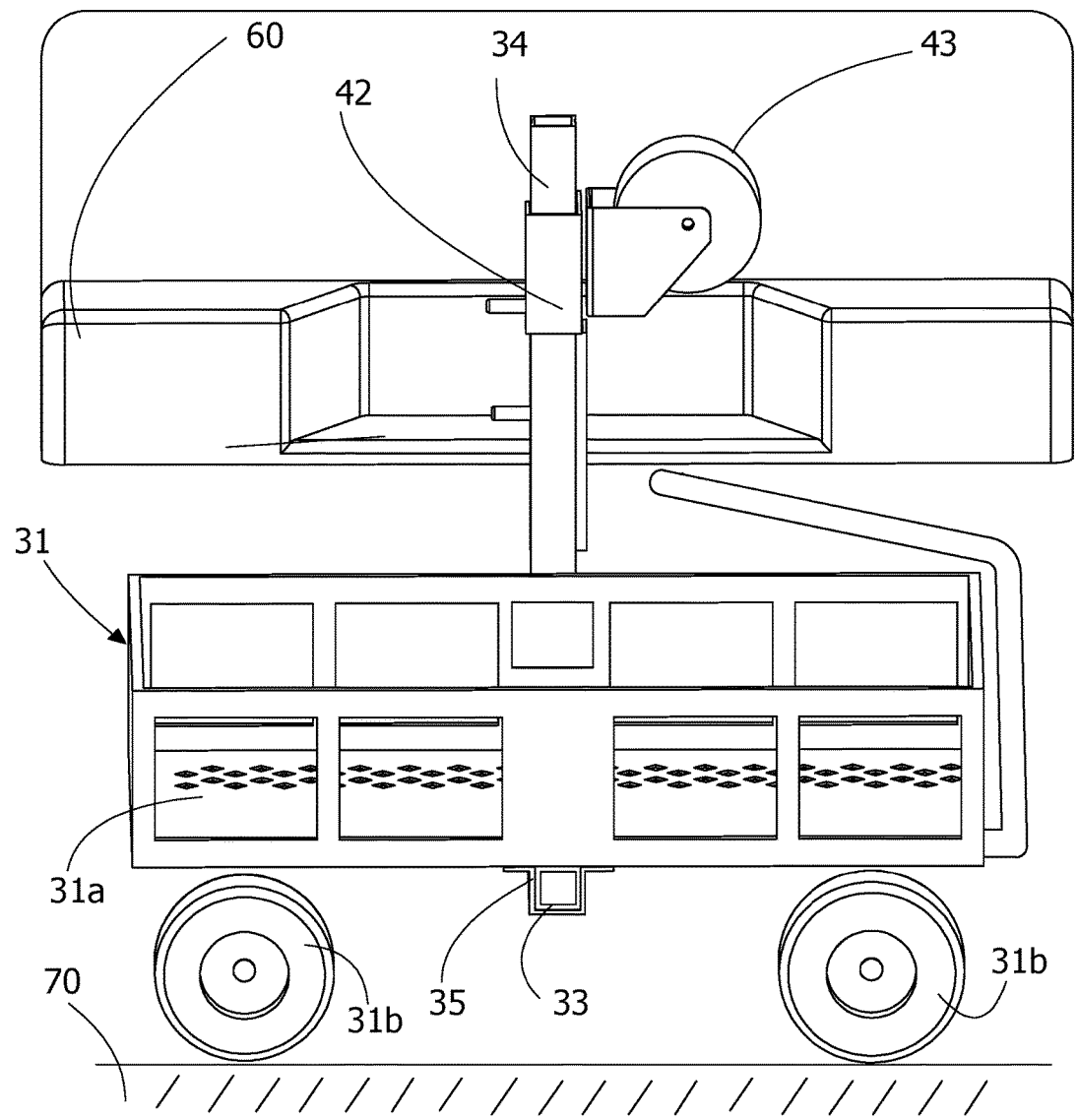
FIG. 18 is a perspective view of the cargo carrier attachment system of FIG. 10.
Figure 20:
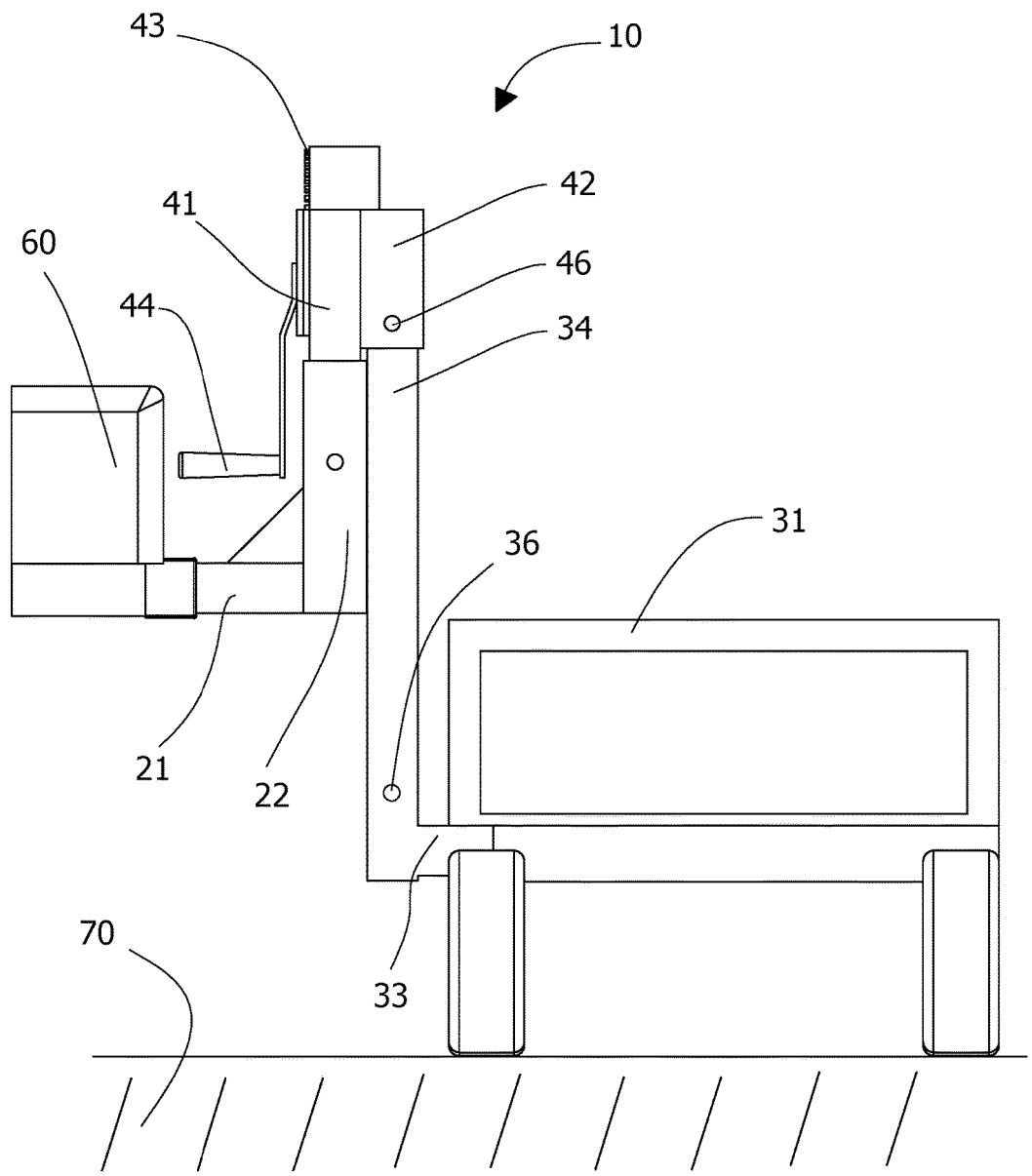
FIG. 20 is a side elevation of the cargo carrier attachment system of FIG. 10.
Figure 21:
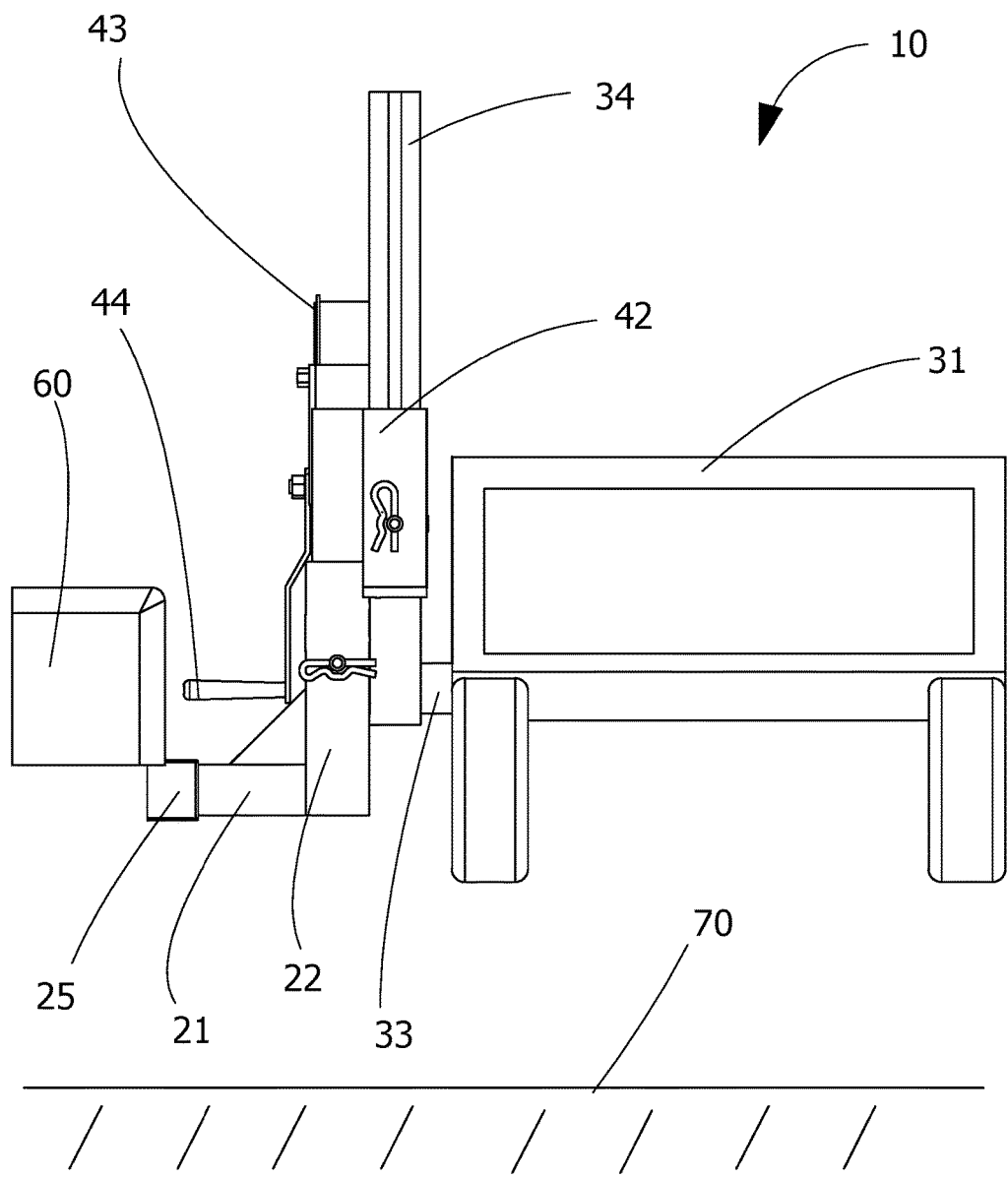
FIG. 21 is another side elevation of the cargo carrier attachment system of FIG. 10.
Figure 25:
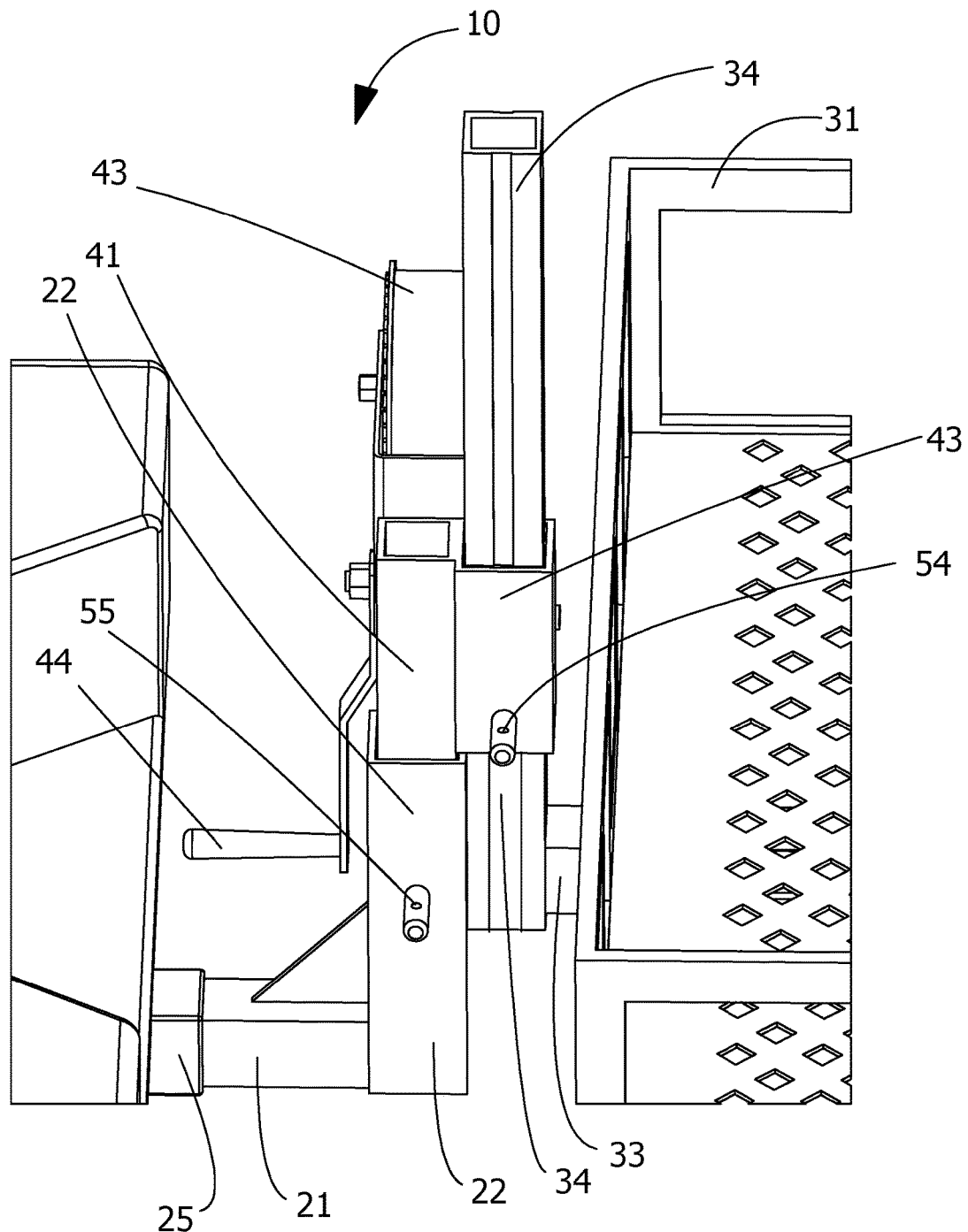
FIG. 25 is another perspective view of the cargo carrier attachment system of FIG. 10.
Figure 26:
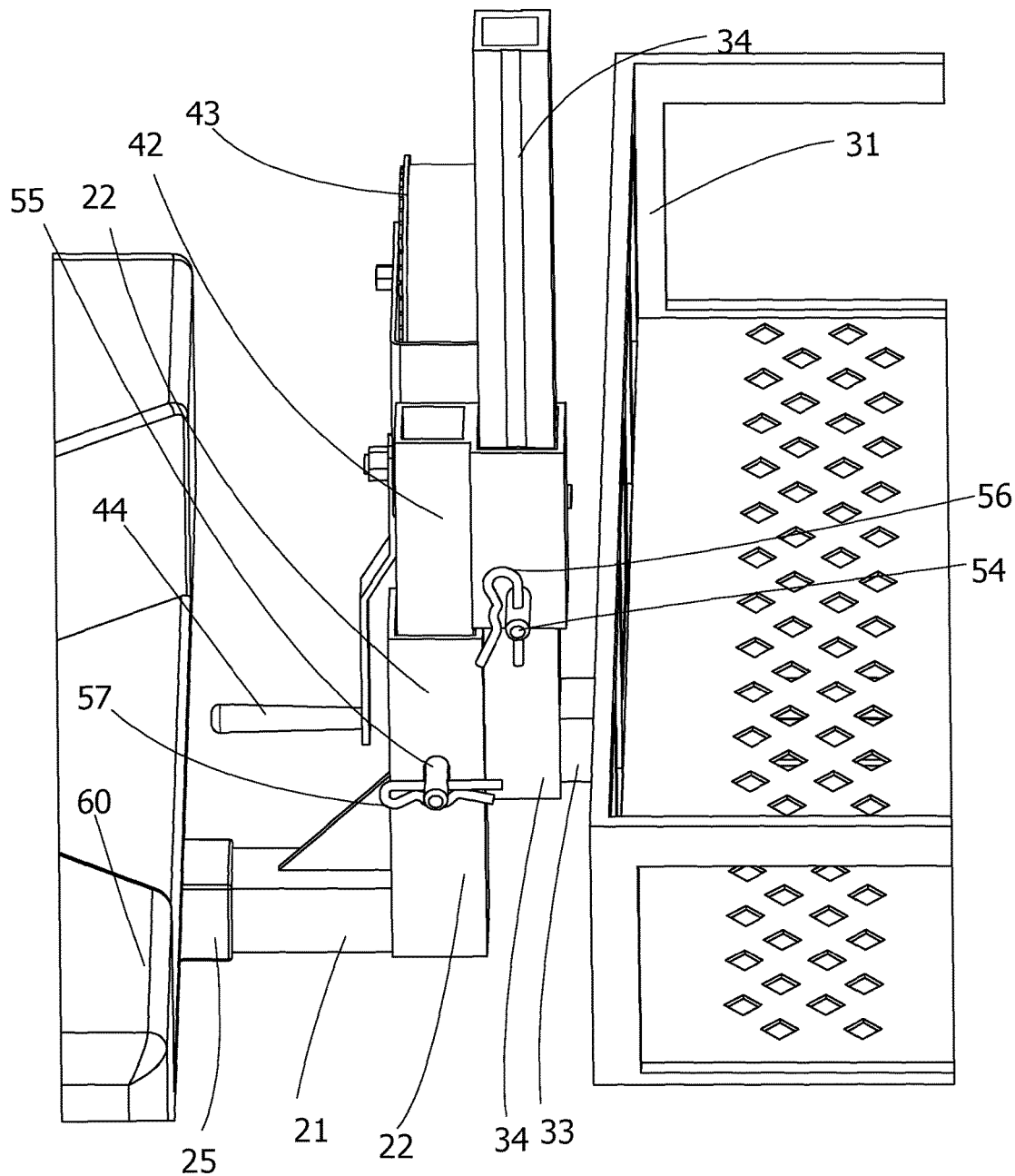
FIG. 26 is another perspective view of the cargo carrier attachment system of FIG. 10.
Figure 27:
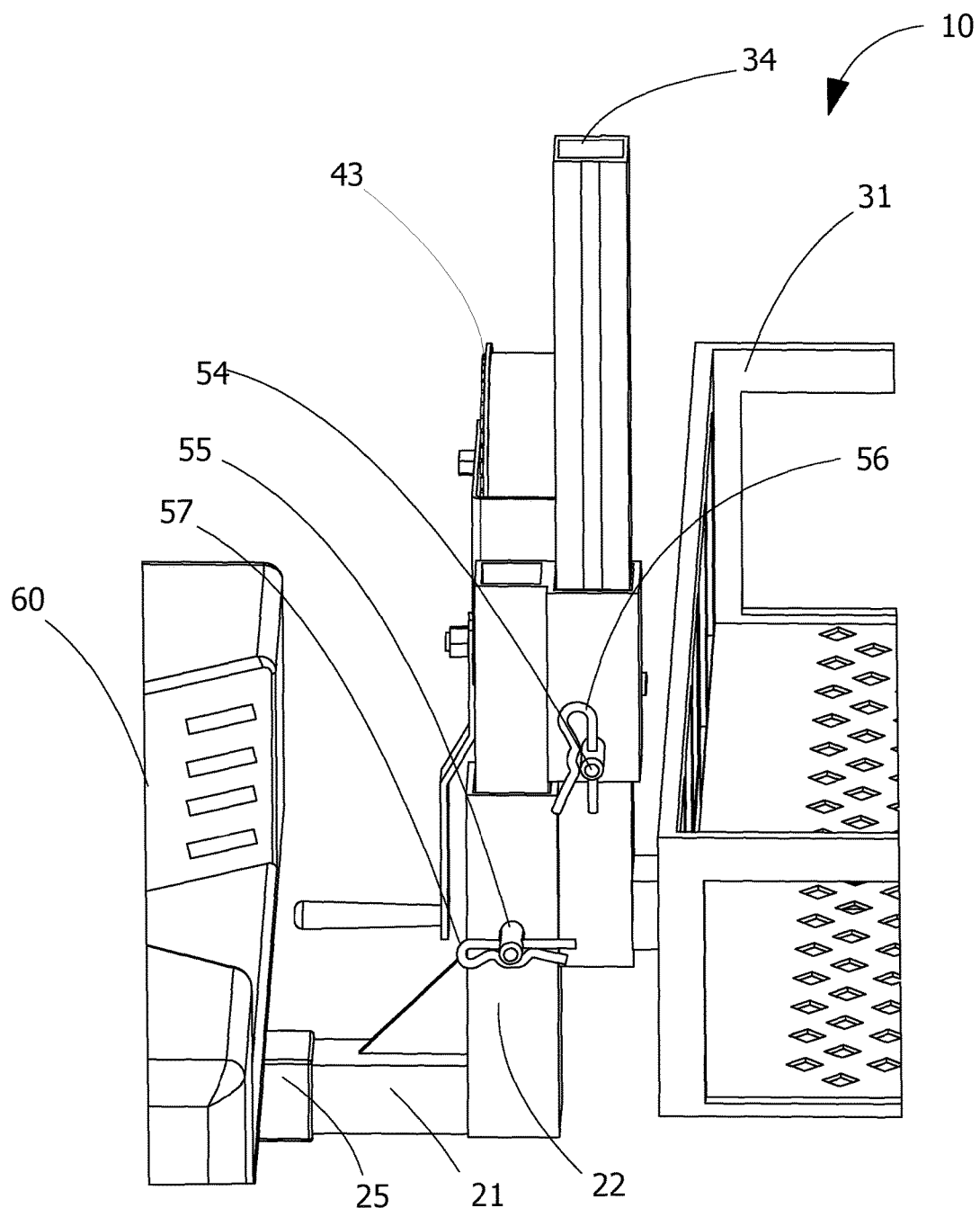
FIG. 27 is another perspective view of the cargo carrier attachment system of FIG. 10.
Figure 28:
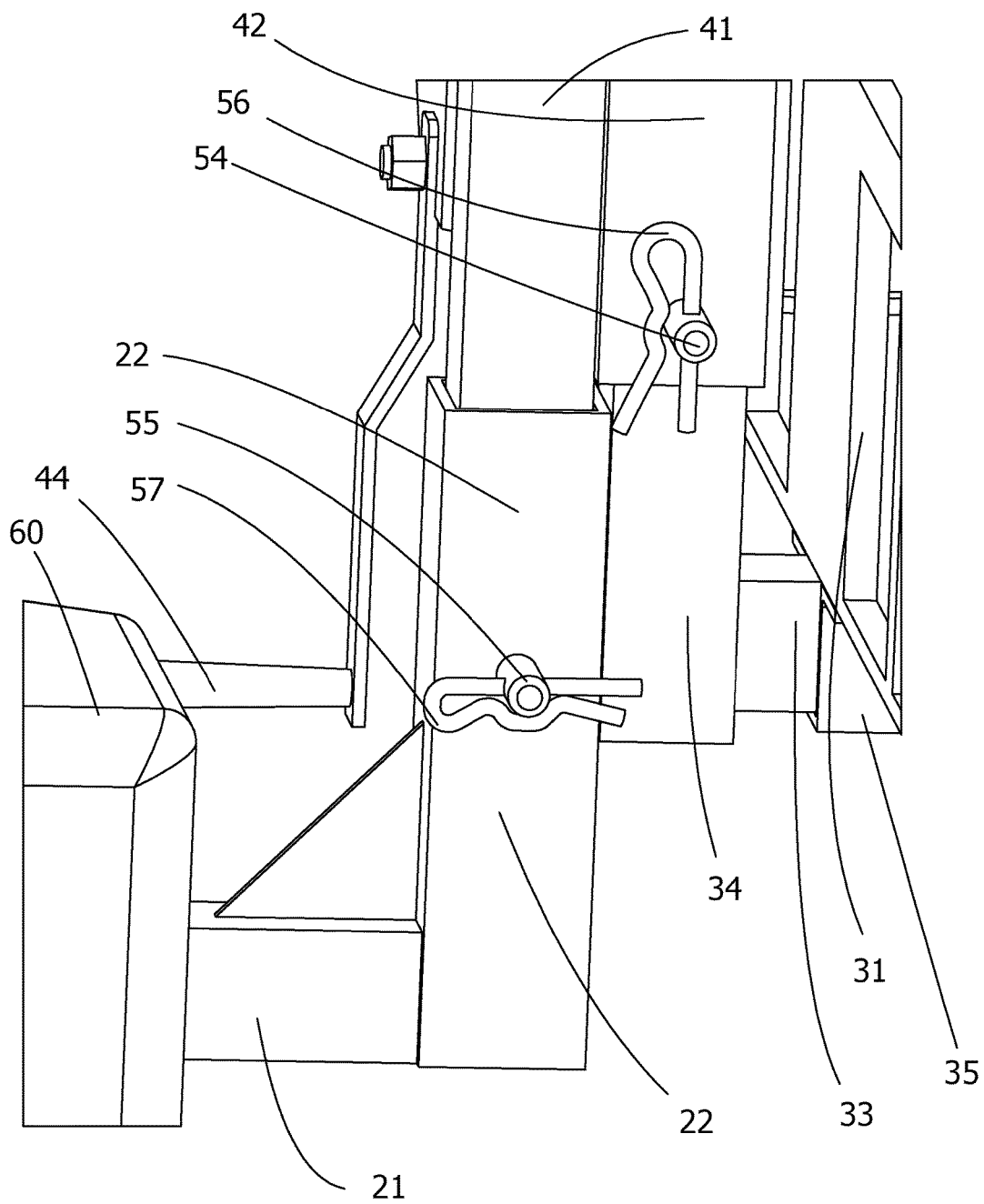
FIG. 28 is a partial perspective view of the cargo carrier attachment system of FIG. 10.
Figure 29:
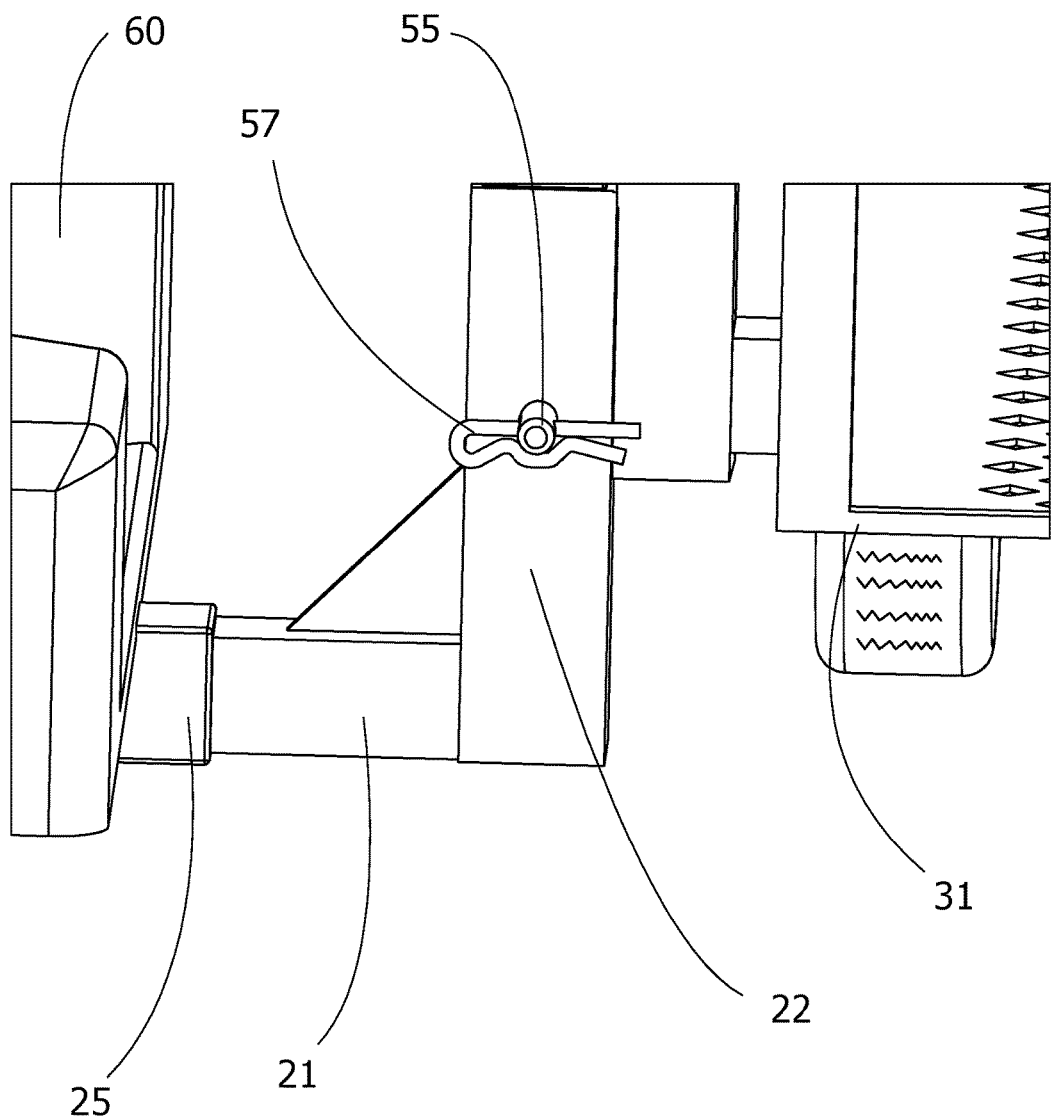
FIG. 29 is another partial perspective view of the cargo carrier attachment system of FIG. 10.
Figure 30:
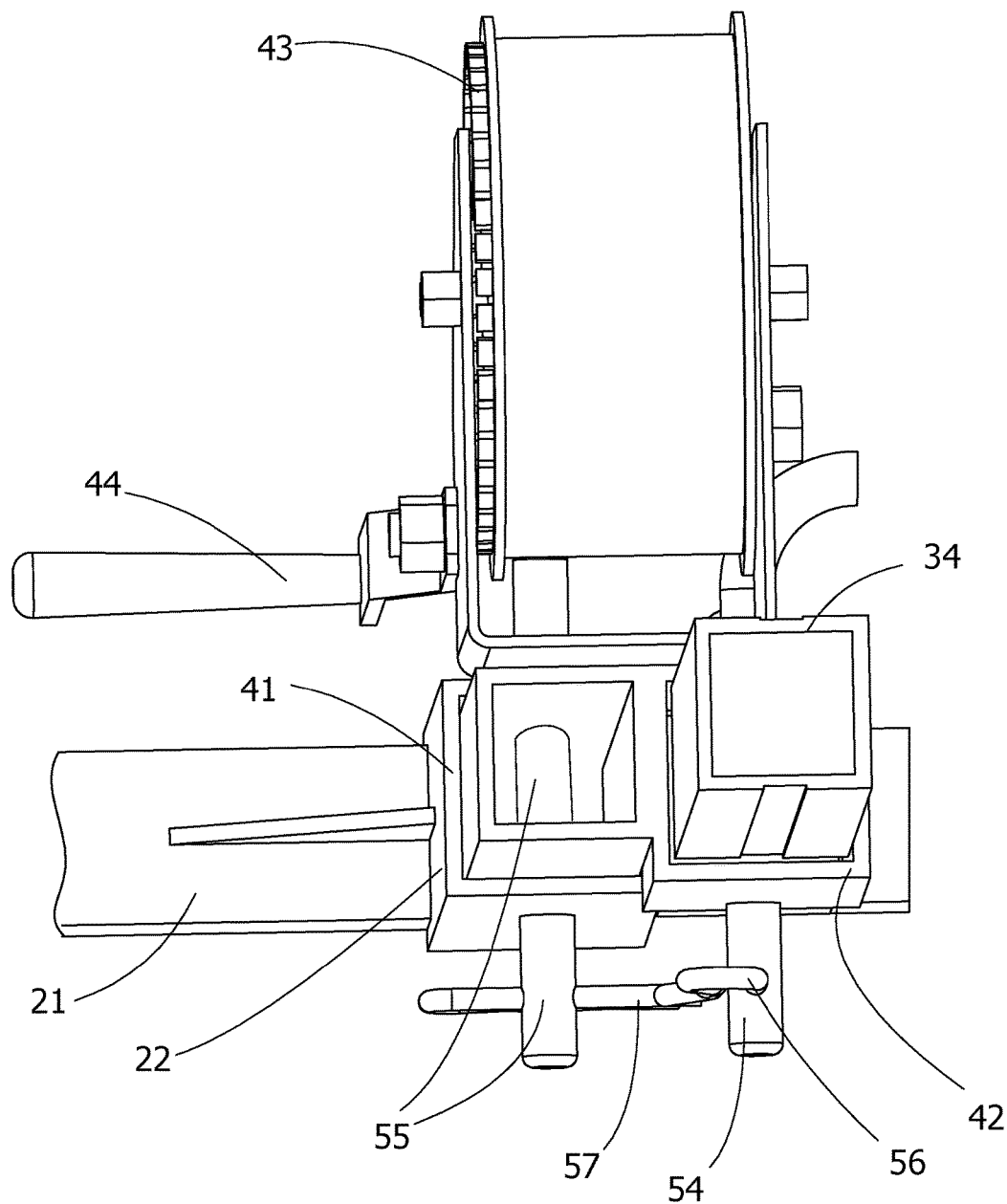
FIG. 30 is another partial perspective view of the cargo carrier attachment system of FIG. 10.

The user continues turning the crank handle 44 clockwise to move the vertical section 34 of the cargo carrier support member 32 upwardly through the receiving member 42 of the coupling device 40, thereby moving the cargo carrier apparatus 30 from the grounded position, shown in FIGS. 18 and 20, until reaching an elevated position, shown in FIGS. 19 and 21, in which the through holes 36 of the second elongate section 34 of the cargo carrier support member 32 are aligned with the through holes 44 of the receiving member 42 of the coupling device 40. A bolt 54 is positioned through the aligned through holes 36, 44, as shown in FIG. 25. As noted above, bolt 55 is positioned through aligned through holes 24, 45 of the hitch attachment vertical section 22 and the first elongate member 41 of the coupling device 40. Locking pins 56, 57 can be positioned through the bolts 54, 55 to keep the bolts in place, as shown in FIGS. 26-30. The bolts 54, 55 provide structural support to securely maintain the cart 31 in the elevated position. The cart 31 can now be transported to a desired location by the truck 60 to which it is securely attached.

Figure 31:
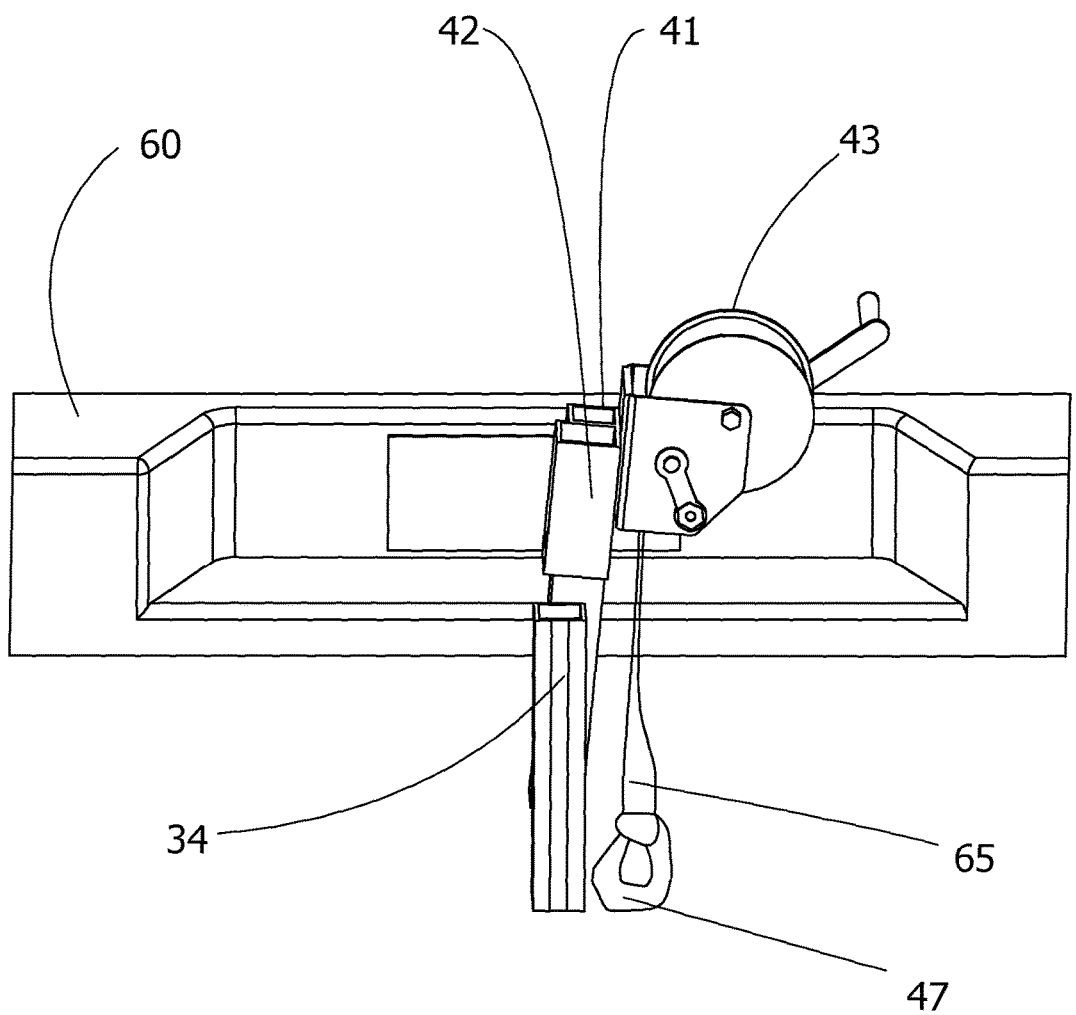
FIG. 31 is another partial perspective view of the cargo carrier attachment system of FIG. 10.

When the truck 60 has reached a destination at which the user wishes to use the cart 31 on the ground, locking pin 56 is removed from bolt 54, and the bolt 54 is removed from the coupling device receiving member 42 and the cargo carrier vertical support bar 34. The crank handle 44 is turned counter-clockwise to lower the cart 31 to the grounded position, shown in FIGS. 18 and 20. Locking pin 57 is removed from bolt 55, and the bolt 55 is removed from the hitch attachment vertical section 22 and the first elongate member 41 of the coupling device 40. At this point, the coupling device 40 can be detached from the hitch attachment apparatus 20 and the cargo carrier apparatus 30, as shown in FIG. 31. As such, the cart 31 is separated from the truck 60 and can be moved freely on the ground, as shown in FIG. 14. The detached coupling device 40 can be stored in the truck 60, the cart 31 or other place. The cart 31 can be easily rolled away from the truck 60, with the cargo carrier support member 32 remaining attached to the cart 31. The cart 31 can be connected to the truck 60, elevated, lowered and disconnected from the truck 60, all while being fully loaded with items. As such, it is not necessary to unload items from the cart 31 in order to attach it to the truck 70.

The winch 43 allows the system 10 to handle very heavy payloads. The winch 43 pulls the payload of the cart 31 up, however, once the payload is up it is supported by the hitch attachment apparatus 20, the elongate members 41, 42 of the coupling device 40, and the cargo carrier support member 32. The hitch attachment apparatus 20, the elongate members 41, 42 of the coupling device 40, and the cargo carrier support member 32 are preferably made of steel tubing.

Figure 32:
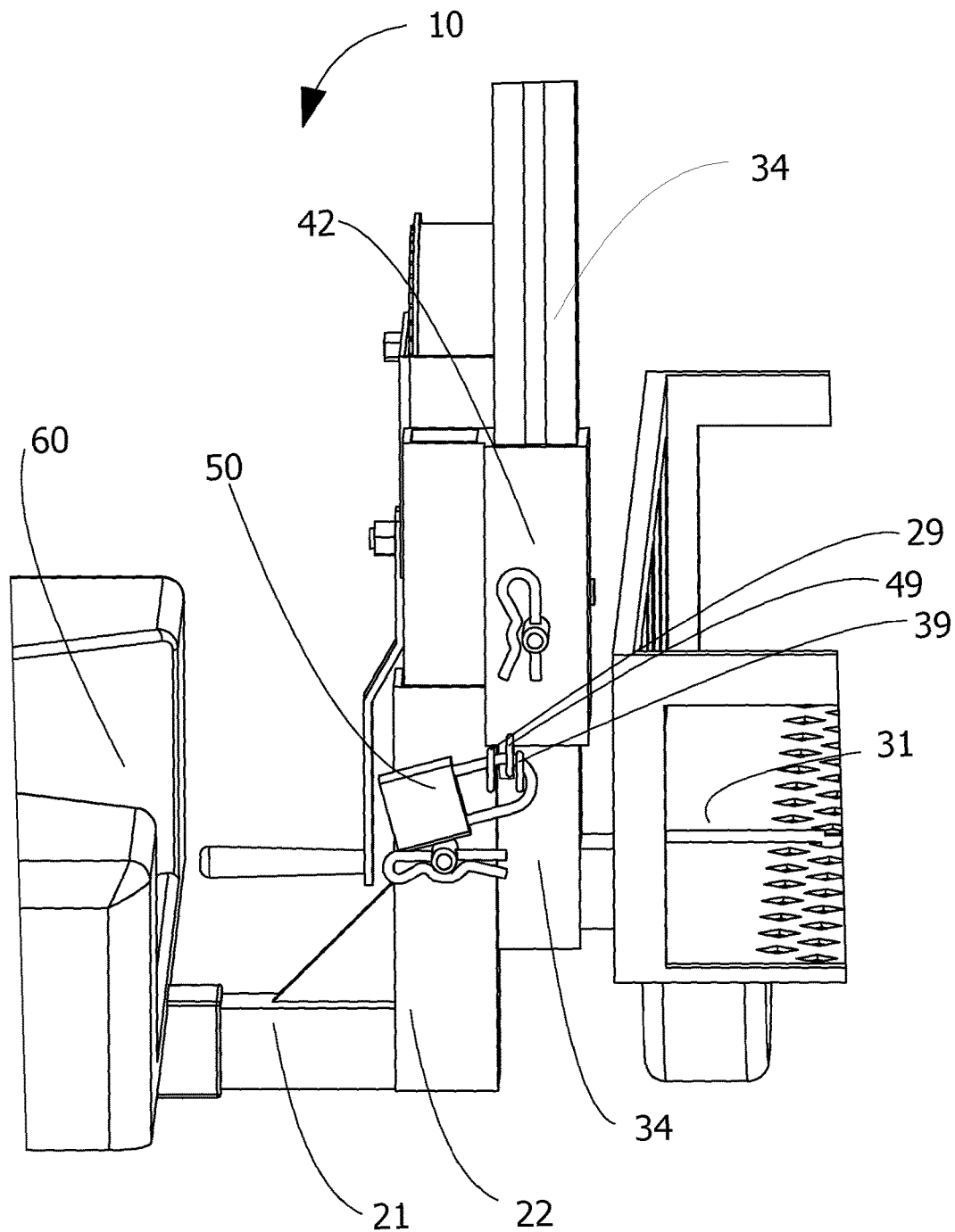
FIG. 32 is a perspective view of a cargo carrier attachment system according to another preferred embodiment of the invention.

In an alternative embodiment, shown in FIG. 32, the system 10 includes a locking mechanism for securely locking the cargo carrier apparatus 30 to the coupling device 40 and the hitch attachment apparatus 20 when the cargo carrier apparatus 30 is in the elevated position. As shown in FIG. 32, a first ring 29 is positioned on the vertical section 22 of the hitch attachment apparatus 20, a second ring 39 is positioned on the vertical section 34 of the cargo carrier support member 32, and a third ring 49 is positioned on the second attachment member 42 of the coupling device 40. All three rings 29, 39, 49 align when the cargo carrier apparatus 30 is in the elevated position and can receive a pad lock 50 therethrough, as shown in FIG. 32. As such, the cargo carrier apparatus 30, coupling device 40 and hitch attachment apparatus 20 are securely locked together, to prevent theft of the cargo carrier apparatus 30 or coupling device 40 while the user is away.

A cargo carrier attachment system and method of using same are described above. Various changes can be made to the invention without departing from its scope. The above description of various embodiments of the invention are provided for the purpose of illustration only and not limitation—the invention being defined by the claims and equivalents thereof.

What is claimed is:

1. A cargo carrier attachment system comprising:
   (a) a hitch attachment apparatus adapted for releasable attachment to a vehicle hitch;
   (b) a cargo carrier apparatus comprising a mobile cargo carrier and a support member attached to the mobile cargo carrier; and
   (c) a coupling device adapted to releasably connect the hitch attachment apparatus and the cargo carrier apparatus, the coupling device comprising a first attachment member adapted to engage the hitch attachment apparatus, and a second attachment member adapted to engage the support member of the cargo carrier apparatus; and
   (d) a winch assembly for elevating the cargo carrier apparatus from a grounded position wherein the mobile cargo carrier sits on a ground surface and an elevated position wherein the mobile cargo carrier is elevated above the ground surface, the winch assembly comprising a winch and an elongate member comprising a strap or cable having a first end operatively connected to the winch and a second end adapted for attachment to the cargo carrier apparatus, wherein the winch assembly lifts the cargo carrier apparatus from the grounded position to the elevated position.

2. The cargo carrier attachment system according to claim 1, wherein the winch comprises a mechanical winch, and the winch assembly further comprises a crank handle operatively connected to the mechanical winch, whereby turning of the crank handle lifts the cargo carrier apparatus.

3. The cargo carrier attachment system according to claim 1, wherein the support member is substantially L-shaped and comprises a first elongate section and a second elongate section extending perpendicularly to the first elongate section, the first elongate section attached to the mobile cargo carrier and the second elongate section extending upwardly from the mobile cargo carrier.

4. The cargo carrier attachment system according to claim 3, wherein the second attachment member of the coupling device is hollow and shaped and sized to receive the second elongate section of the cargo carrier apparatus support member therein.

5. The cargo carrier attachment system according to claim 4, wherein the hitch attachment apparatus is substantially L-shaped and comprises a first elongate section shaped and sized to be received in a receiving hitch mounted on a vehicle, and a second elongate section extending perpendicularly to the first elongate section, the second elongate section being substantially hollow and shaped and sized to receive the first attachment member of the coupling device therein.

6. The cargo carrier attachment system according to claim 5, wherein the winch comprises a mechanical winch and the winch assembly further comprises a crank handle operatively connected to the mechanical winch, the mechanical winch attached to at least one of the first attachment member and second attachment member of the coupling device and operatively connected to the cargo carrier apparatus support member, whereby turning of the crank handle elevates the cargo carrier apparatus.

7. A cargo carrier attachment system comprising:
   (a) a hitch attachment apparatus comprising a first elongate section and a second elongate section extending upwardly at an approximately ninety-degree angle from the first elongate section, the first elongate section adapted for releasable attachment to a vehicle hitch;
   (b) a cargo carrier apparatus comprising a mobile cargo carrier and a support member attached to the mobile cargo carrier, the support member comprising a first elongate section and a second elongate section extending upwardly at an approximately ninety-degree angle from the first elongate section, the first elongate section attached to the cart; and
   (c) a coupling device adapted to be releasably attached to the hitch attachment apparatus and the cargo carrier apparatus, the coupling device comprising a first attachment member adapted to releasably engage the second elongate section of the hitch attachment apparatus, and a second attachment member adapted to releasably engage the second elongate section of the cargo carrier apparatus support member, and further comprising a winch assembly operatively connected to the cargo carrier apparatus support member, the winch assembly comprising a winch, a crank handle operatively connected to the winch, and an elongate member comprising a strap or cable having a first end operatively connected to the winch and a second end adapted to attach to the cargo carrier apparatus support member, whereby turning of the winch elevates the cargo carrier apparatus from a grounded position wherein the mobile cargo carrier sits on a ground surface and an elevated position wherein the mobile cargo carrier resides at a predetermined position above the ground surface.

8. The cargo carrier attachment system according to claim 7, wherein the winch is attached proximate a top edge of at least one of the first attachment member and the second attachment member of the coupling device.

9. The cargo carrier attachment system according to claim 7, wherein the mobile cargo carrier comprises a cart comprising a body section adapted for carrying items therein, and a plurality of wheels attached to the body section for facilitating movement of the cart on the ground surface.

10. The cargo carrier attachment system according to claim 9, wherein the first elongate section of the cargo carrier apparatus support member is attached to an under side of the body section of the cart, and the second elongate section of the cargo carrier apparatus support member extends upwardly from first elongate section.

11. The cargo carrier attachment system according to claim 10, wherein the second attachment member of the coupling device is hollow and shaped and sized to receive the second elongate section of the cargo carrier apparatus support member therein.

12. The cargo carrier attachment system according to claim 11, wherein the first elongate section and the second elongate section of the hitch attachment apparatus are substantially hollow, the first elongate section shaped and sized to be positioned in a vehicle receiving hitch, and the second elongate section shaped and sized to receive the first attachment member of the coupling device therein.

13. The cargo carrier attachment system according to claim 11, wherein turning of the crank handle pulls the second elongate section of the cargo carrier apparatus upwardly through the second attachment member of the coupling device, whereby the cart can be elevated to the elevated position.

14. The cargo carrier attachment system according to claim 13, wherein the second elongate section of the cargo carrier apparatus has at least one through hole formed therein and the second attachment member of the coupling device has at least one through hole formed therein such that said at least one through holes are aligned when the cargo carrier apparatus is in the elevated position, and further comprising at least one fastening member for positioning in the aligned through holes, whereby the cargo carrier apparatus is securely maintained in the elevated position.

15. The cargo carrier attachment system according to claim 1, wherein the winch and the crank handle are attached proximate a top edge of at least one of the first attachment member and the second attachment member of the coupling device, and further wherein turning of the crank handle causes the elongate member to pull the cargo carrier apparatus upwardly to the elevated position.

16. The cargo carrier attachment system according to claim 1, wherein the winch comprises an electrical winch.

17. The cargo carrier attachment system according to claim 7, wherein turning of the crank handle causes the elongate member to pull the cargo carrier apparatus upwardly, whereby the cart can be elevated to the elevated position.

18. The cargo carrier attachment system according to claim 7, wherein the second end of the elongate member includes a fastening member, and the cargo carrier apparatus support member defines a void for receiving and engaging the fastening member.

19. The cargo carrier attachment system according to claim 7, wherein the winch and the crank handle are attached proximate a top edge of at least one of the first attachment member and the second attachment member of the coupling device, and further wherein the winch assembly pulls the second elongate section of the cargo carrier apparatus upwardly through the second attachment member of the coupling device, whereby the cart can be elevated to the elevated position.

20. The cargo carrier attachment system according to claim 12, wherein the second elongate section of the hitch attachment apparatus defines an opening therein, and the first attachment member of the coupling device defines an opening therein that is aligned with the opening defined by the second elongate section of the hitch attachment apparatus, and further comprising a fastening member positioned through the opening defined by the second elongate section of the hitch attachment apparatus and the opening defined by the first attachment member of the coupling device.

* * * * *